United States Patent
Tsai et al.

(10) Patent No.: US 9,188,766 B1
(45) Date of Patent: Nov. 17, 2015

(54) FIVE-PIECE OPTICAL LENS SYSTEM

(71) Applicant: NEWMAX TECHNOLOGY CO., LTD., Taichung (TW)

(72) Inventors: Fei-Hsin Tsai, Taichung (TW); Shu-Tzu Lai, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 14/306,229

(22) Filed: Jun. 17, 2014

(51) Int. Cl.
 *G02B 3/02* (2006.01)
 *G02B 13/00* (2006.01)
 *G02B 9/60* (2006.01)

(52) U.S. Cl.
 CPC .............. *G02B 13/0045* (2013.01); *G02B 9/60* (2013.01)

(58) Field of Classification Search
 CPC .................................................. G02B 13/0045
 USPC ........................................................... 359/717
 See application file for complete search history.

(56) References Cited

U.S. PATENT DOCUMENTS

2012/0147482 A1\* 6/2012 Tsai ............................. 359/714

\* cited by examiner

*Primary Examiner* — James Jones
(74) *Attorney, Agent, or Firm* — Patent Office of Bang Shia

(57) ABSTRACT

A five-piece optical lens system includes, in order from the object side to the image side: a stop, a first lens element with a positive refractive power has a convex image-side surface and at least one aspheric surface; a second lens element with a negative refractive power has a convex object-side surface and at least one aspheric surface; a third lens element has a concave image-side surface and at least one aspheric surface; a fourth lens element with a positive refractive power has a convex object-side surface and at least one aspheric surface, and a fifth lens element with a negative refractive power has a concave object-side surface and at least one aspheric surface. Thereby, such a system can be applied to a high resolution mobile phone.

14 Claims, 20 Drawing Sheets

FIVE-PIECE OPTICAL LENS SYSTEM

BACKGROUND OF THE INVENTION

1. Field of the Invention

The present invention relates to an optical lens system, and more particularly to a five-piece optical lens system.

2. Description of the Prior Art

Miniaturized optical lens systems with high resolution have been the standard equipment for portable electronic products, and the electronic sensor of a general digital camera is typically a CCD (Charge Coupled Device) or CMOS (Complementary Metal Oxide Semiconductor) sensor. Due to advances in semiconductor manufacturing, the pixel size of sensor has been reduced continuously, and miniaturized optical lens systems have increasingly higher resolution. Therefore, there's an increasing demand for an imaging lens system with better image quality.

Conventional miniaturized lens systems used in portable electronic products mostly consist of four lens elements, however, miniaturization, high performance and high resolution have become the trend of modern electronic products, such as, mobile phone. As the pixel size of electronic imaging sensors gradually becomes smaller and smaller, and the system requires higher image quality. The conventional optical lens system comprising four lens elements cannot satisfy the requirements of higher resolution optical lens systems.

The present invention mitigates and/or obviates the aforementioned disadvantages.

SUMMARY OF THE INVENTION

The primary objective of the present invention is to provide a five-piece optical lens system without having an excessively long total track length, the five-piece optical lens system not only can be applied to a high resolution mobile phone, but also has a wide field of view, big stop, high pixel, high resolution and low height.

A five-piece optical lens system in accordance with the present invention comprises, in order from the object side to the image side: a stop, a first lens element with a positive refractive power having a convex image-side surface, at least one of an object-side and the image-side surfaces of the first lens element being aspheric; a second lens element with a negative refractive power having a convex object-side surface, at least one of the object-side and an image-side surfaces of the second lens element being aspheric; a third lens element having a concave image-side surface, at least one of an object-side and the image-side surfaces of the third lens element being aspheric; a fourth lens element with a positive refractive power having a convex object-side surface, at least one of the object-side and an image-side surfaces of the fourth lens element being aspheric, and a fifth lens element with a negative refractive power having a concave object-side surface, at least one of the object-side and an image-side surfaces of the fifth lens element being aspheric.

Preferably, at least one of the object-side and image-side surfaces of the third lens element has an inflection point, and at least one of the object-side and image-side surfaces of the fourth lens element has an inflection point Therefore, it can further correcting the aberration of the off-axis.

Preferably, the focal length of the first lens element is f1, the focal length of the second lens element is f2, and they satisfy the relation: $-0.8<f1/f2<-0.4$, so that the refractive power of the first lens element and the second lens element are more suitable, it will be favorable to obtain a wide field of view and avoid the excessive increase of aberration of the optical lens system.

Preferably, the focal length of the second lens element is f2, the focal length of the fourth lens element is f4, and they satisfy the relation: $-3.3<f2/f4<-2.0$, so that the negative refractive power of the optical lens system is more suitable, it will be favorable to correct the aberration of the optical lens system and improve the image quality of the optical lens system.

Preferably, the focal length of the fourth lens element is f4, the focal length of the fifth lens element is f5, and they satisfy the relation: $-1.4<f4/f5-0.8$, so that the refractive power of the fourth lens element and the fifth lens element are more suitable, it will be favorable to correct the aberration of the optical lens system. Preferably, the focal length of the first lens element is f1, the focal length of the second lens element and the third lens element combined is f23, and they satisfy the relation: $-0.9<f1/f23<-0.3$, it will be favorable to reduce the total track length of the optical lens system and correct aberration of the optical lens system. Therefore, the refractive power of the whole optical lens system will be favorable to provide wide field of view and better aberration correcting ability.

Preferably, the focal length of the second lens element and the third lens element combined is f23, the focal length of the fourth lens element is f4, and they satisfy the relation: $-3.8<f23/f4<1.8$, so that the aberration of the optical lens system can be corrected effectively.

Preferably, the focal length of the first lens element is f1, the focal length of the second lens element, the third lens element and the fourth lens element combined is f234, and they satisfy the relation: $1.0<f1/f234<2.0$, it will be favorable to reduce the total track length of the optical lens system and correct aberration of the optical lens system. Therefore, the refractive power of the whole optical lens system will be favorable to provide wide field of view and better aberration correcting ability.

Preferably, the focal length of the second lens element, the third lens element and the fourth lens element combined is f234, the focal length of the fifth lens element is f5, and they satisfy the relation: $-1.6<f234/f5<-0.8$, it will be favorable to reduce the total track length of the optical lens system and correct aberration of the optical lens system. Therefore, the refractive power of the whole optical lens system will be favorable to provide wide field of view and better aberration correcting ability.

Preferably, the focal length of the first lens element and the second lens element combined is f12, the focal length of the third lens element and the fourth lens element combined is f34, and they satisfy the relation: $2.0<f12/f34<4.5$, so that the aberration of the optical lens system can be corrected effectively.

Preferably, the focal length of the second lens element is f2, the focal length of the third lens element and the fourth lens element combined is f34, and they satisfy the relation: $-3.5<f2/f34<-1.7$, it will be favorable to reduce the total track length of the optical lens system and correct aberration of the optical lens system. Therefore, the refractive power of the whole optical lens system will be favorable to provide wide field of view and better aberration correcting ability.

Preferably, the focal length of the third lens element and the fourth lens element combined is f34, the focal length of the fifth lens element is f5, and they satisfy the relation: $-1.4<f34/f5<-0.8$, it will be favorable to reduce the total track length of the optical lens system and correct aberration of the optical lens system. Therefore, the refractive power of the whole optical lens system will be favorable to provide wide field of view and better aberration correcting ability.

Preferably, the focal length of the first lens element and the second lens element combined is f12, the focal length of the third lens element, the fourth lens element and the fifth lens element combined is f345, and they satisfy the relation: 0.1<f12/f345<0.6, it will be favorable to reduce the total track length of the optical lens system and correct aberration of the optical lens system. Therefore, the refractive power of the whole optical lens system will be favorable to provide wide field of view and better aberration correcting ability.

Preferably, the focal length of the first lens element, the second lens element and the third lens element combined is f123, the focal length of the fifth lens element is f5, and they satisfy the relation: −4.2<f123/f5<−2.7, it will be favorable to reduce the total track length of the optical lens system and correct aberration of the optical lens system. Therefore, the refractive power of the whole optical lens system will be favorable to provide wide field of view and better aberration correcting ability.

Preferably, the focal length of the five-piece optical lens system is f, the distance from the object-side surface of the first lens element to the image plane along the optical axis is TL, and they satisfy the relation: 0.7<f/TL<0.9, it will be favorable to obtain a wide field of view and maintain the objective of miniaturization of the five-piece optical lens system, which can be used in thin electronic products.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
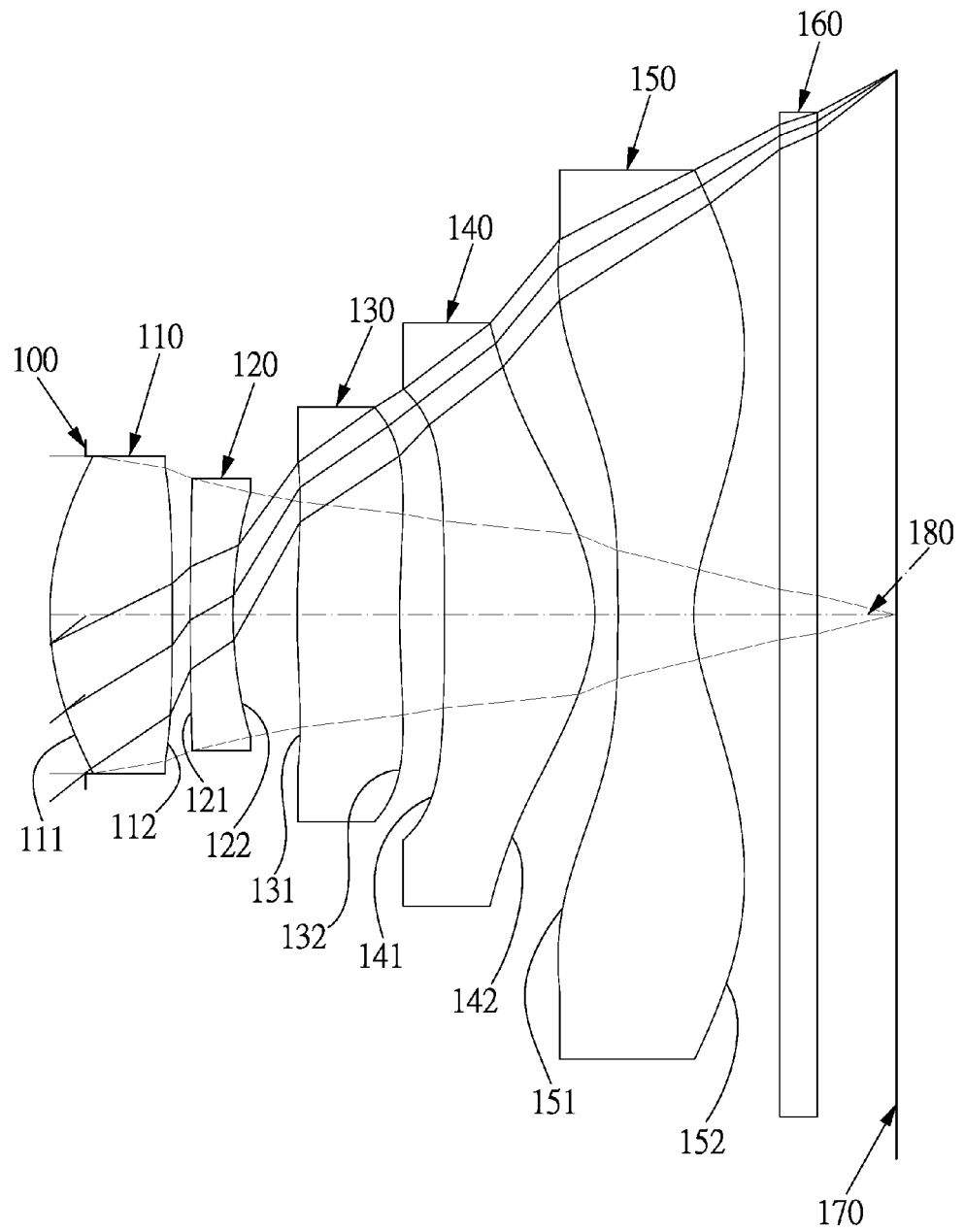
FIG. 1A shows a five-piece optical lens system in accordance with a first embodiment of the present invention.
Figure 1B:
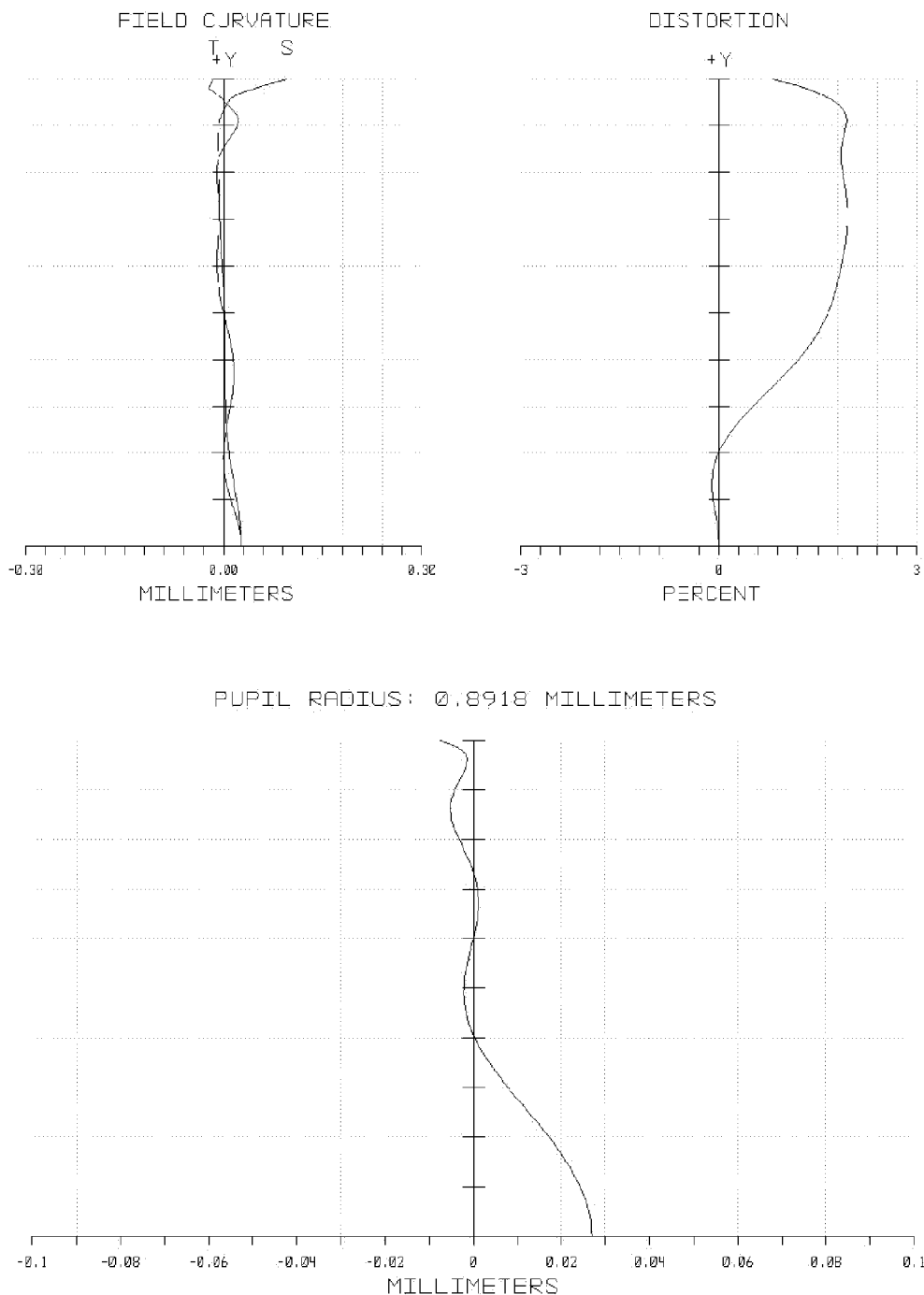
FIG. 1B shows the longitudinal spherical aberration curve, the astigmatic field curve and the distortion curve of the first embodiment of the present invention.

FIG. 1A shows a five-piece optical lens system in accordance with a first embodiment of the present invention, and FIG. 1B shows, in order from left to right, the longitudinal spherical aberration curves, the astigmatic field curves, and the distortion curve of the first embodiment of the present invention. A five-piece optical lens system in accordance with the first embodiment of the present invention comprises, in order from the object side to the image side: a stop 100, a first lens element 110, a second lens element 120, a third lens element 130, a fourth lens element 140, a fifth lens element 150, an IR cut filter 160 and an image plane 170.

The first lens element 110 with a positive refractive power has an object-side surface 111 being convex near an optical axis 180 and an image-side surface 112 being convex near the optical axis 180, the object-side surface 111 and the image-side surface 112 are aspheric, and the first lens element 110 is made of plastic material.

The second lens element 120 with a negative refractive power has an object-side surface 121 being convex near the optical axis 180 and an image-side surface 122 being concave near the optical axis 180, the object-side surface 121 and the image-side surface 122 are aspheric, and the second lens element 120 is made of plastic material.

The third lens element 130 with a negative refractive power has an object-side surface 131 being convex near the optical axis 180 and an image-side surface 132 being concave near the optical axis 180, the object-side surface 131 and the image-side surface 132 are aspheric, the third lens element 130 is made of plastic material, and at least one of the object-side and image-side surfaces 131, 132 of the third lens element 130 has an inflection point.

The fourth lens element 140 with a positive refractive power has an object-side surface 141 being convex near the optical axis 180 and an image-side surface 142 being convex near the optical axis 180, the object-side surface 141 and the image-side surface 142 are aspheric, the fourth lens element 140 is made of plastic material, and at least one of the object-side and image-side surfaces 141, 142 of the fourth lens element 140 has an inflection point.

The fifth lens element 150 with a negative refractive power has an object-side surface 151 being concave near the optical axis 180 and an image-side surface 152 being concave near the optical axis 180, the object-side surface 151 and the image-side surface 152 are aspheric, and the fifth lens element 150 is made of plastic material.

The IR cut filter 160 made of glass is located between the fifth lens element 150 and the image plane 170 and has no influence on the focal length of the five-piece optical lens system.

The equation for the aspheric surface profiles of the first embodiment is expressed as follows:

$$z = \frac{ch}{1+[1-(k+1)^2c^2h^2]^{0.5}} + Ah^4 + Bh^6 + Ch^8 + Dh^{10} + Eh^{12} + Fh^{14} + \ldots$$

wherein:

z represents the value of a reference position with respect to a vertex of the surface of a lens and a position with a height h along the optical axis 180;

c represents a paraxial curvature equal to 1/R (R: a paraxial radius of curvature);

h represents a vertical distance from the point on the curve of the aspheric surface to the optical axis 180;

k represents the conic constant;

A, B, C, D, E, F, . . . :represent the high-order aspheric coefficients.

In the first embodiment of the present five-piece optical lens system, the focal length of the five-piece optical lens system is f, the f-number of the five-piece optical lens system is Fno, the field of view of the five-piece optical lens system is 2ω, and they satisfy the relations:

f=3.8094 mm;
Fno=2.0; and
2ω=77°.

In the first embodiment of the present five-piece optical lens system, the focal length of the first lens element 110 is f1, the focal length of the second lens element 120 is f2, and they satisfy the relation:

f1/f2=−0.6417.

In the first embodiment of the present five-piece optical lens system, the focal length of the second lens element 120 is f2, the focal length of the fourth lens element 140 is f4, and they satisfy the relation:

f2/f4=−2.3983.

In the first embodiment of the present five-piece optical lens system, the focal length of the fourth lens element 140 is f4, the focal length of the fifth lens element 150 is f5, and they satisfy the relation:

f4/f5=−1.0865.

In the first embodiment of the present five-piece optical lens system, the focal length of the first lens element 110 is f1, the focal length of the second lens element 120 and the third lens element 130 combined is f23, and they satisfy the relation:

f1/f23=−0.6966.

In the first embodiment of the present five-piece optical lens system, the focal length of the second lens element 120 and the third lens element 130 combined is f23, the focal length of the fourth lens element 140 is f4, and they satisfy the relation:

f23/f4=−2.2094.

In the first embodiment of the present five-piece optical lens system, the focal length of the first lens element 110 is f1, the focal length of the second lens element 120, the third lens element 130 and the fourth lens element 140 combined is f234, and they satisfy the relation:

f1/f234=1.3440.

In the first embodiment of the present five-piece optical lens system, the focal length of the second lens element 120, the third lens element 130 and the fourth lens element 140 combined is f234, the focal length of the fifth lens element 150 is f5, and they satisfy the relation:

f234/f5=−1.2442.

In the first embodiment of the present five-piece optical lens system, the focal length of the first lens element 110 and the second lens element 120 combined is f12, the focal length of the third lens element 130 and the fourth lens element 140 combined is f34, and they satisfy the relation:

f12/f34=2.8731.

In the first embodiment of the present five-piece optical lens system, the focal length of the second lens element 120 is f2, the focal length of the third lens element 130 and the fourth lens element 140 combined is f34, and they satisfy the relation:

f2/f34=−2.2899.

In the first embodiment of the present five-piece optical lens system, the focal length of the third lens element 130 and the fourth lens element 140 combined is f34, the focal length of the fifth lens element 150 is f5, and they satisfy the relation:

f34/f5=−1.1379.

In the first embodiment of the present five-piece optical lens system, the focal length of the first lens element 110 and the second lens element 120 combined is f12, the focal length of the third lens element 130, the fourth lens element 140 and the fifth lens element 150 combined is f345, and they satisfy the relation:

f12/f345=0.3610.

In the first embodiment of the present five-piece optical lens system, the focal length of the first lens element 110, the second lens element 120 and the third lens element 130 combined is f123, the focal length of the fifth lens element 150 is f5, and they satisfy the relation:

f123/f5=−3.2567.

In the first embodiment of the present five-piece optical lens system, the focal length of the five-piece optical lens system is f, the distance from the object-side surface 111 of the first lens element 110 to the image plane 170 along the optical axis 180 is TL, and they satisfy the relation:

f/TL=0.8012.

The detailed optical data of the first embodiment is shown in table 1, and the aspheric surface data is shown in table 2.

TABLE 1

| (Embodiment 1) f(focal length) = 3.8094 mm, Fno = 2.0, 2ω = 77°. | | | | | | |
|---|---|---|---|---|---|---|
| Surface | | Curvature Radius | Thickness | Material | nd | vd |
| 0 | Object | Infinity | Infinity | | | |
| 1 | | Infinity | 0.1994346 | | | |
| 2 | STO | Infinity | −0.1994346 | | | |
| 3 | Lens 1 | 1.653516(ASP) | 0.6887734 | Plastic | 1.535 | 56 |
| 4 | | −14.69155(ASP) | 0.1 | | | |

TABLE 1-continued (Embodiment 1)
f(focal length) = 3.8094 mm, Fno = 2.0, 2ω = 77°.

| Surface | | Curvature Radius | Thickness | Material | nd | vd |
|---|---|---|---|---|---|---|
| 5 | Lens 2 | 28.01017(ASP) | 0.24 | Plastic | 1.634 | 23.9 |
| 6 | | 2.53801(ASP) | 0.3606863 | | | |
| 7 | Lens 3 | 5.663177(ASP) | 0.5749466 | Plastic | 1.535 | 56 |
| 8 | | 4.963155(ASP) | 0.2511096 | | | |
| 9 | Lens 4 | 104.9848(ASP) | 0.8448788 | Plastic | 1.535 | 56 |
| 10 | | −0.9737652(ASP) | 0.1300302 | | | |
| 11 | Lens 5 | −24.07223(ASP) | 0.4251034 | Plastic | 1.535 | 56 |
| 12 | | 0.9429871(ASP) | 0.4840447 | | | |
| 13 | IR-filter | Infinity | 0.21 | Glass | 1.5168 | 64.16734 |
| 14 | | Infinity | 0.4448469 | | | |
| 15 | Image | Infinity | | | | |

TABLE 2

Aspheric Coefficients

| Surface | 3 | 4 | 5 | 6 | 7 |
|---|---|---|---|---|---|
| K = | −1.96478 | 187.9431 | 9.185283 | −2.02642 | −18.0161 |
| A = | 0.0440619 | −0.0164 | −0.03089 | −0.03011 | −0.12556 |
| B = | 0.022937 | 0.127877 | 0.224467 | 0.264138 | 0.075631 |
| C = | −0.1452 | −0.43563 | −0.5042 | −0.41394 | −0.09208 |
| D = | 0.281803 | 0.490657 | 0.415775 | 0.331881 | 0.065057 |
| E = | −0.28516 | −0.28456 | −0.07719 | −0.05813 | −0.02901 |
| F = | 0.09216 | 0.068395 | −0.02477 | −0.02033 | −0.00296 |

| Surface | 8 | 9 | 10 | 11 | 12 |
|---|---|---|---|---|---|
| K = | −185.258 | 1.240549 | −4.57879 | −107.124 | −6.11227 |
| A = | −0.0104 | −0.08335 | −0.10423 | −0.15438 | −0.08563 |
| B = | −0.1368 | 0.109208 | 0.10488 | 0.076818 | 0.032139 |
| C = | 0.149283 | −0.11337 | −0.0364 | −0.01634 | −0.00805 |
| D = | −0.15275 | 0.033844 | 0.005744 | 0.001809 | 0.00109 |
| E = | 0.079501 | −0.00421 | −4.06E−04 | −1.02E−04 | −6.67E−05 |
| F = | −0.01706 | 0.000193 | 1.06E−05 | 2.34E−06 | 1.14E−06 |

The units of the radius of curvature, the thickness and the focal length in table 1 are expressed in mm, the surface numbers 3-12 represent the surfaces sequentially arranged from the object-side to the image-side along the optical axis. In table 2, k represents the conic coefficient of the equation of the aspheric surface profiles, and A, B, C, D, E, F, . . . :represent the high-order aspheric coefficients. The tables presented below for each embodiment are the corresponding schematic parameter and aberration curves, and the definitions of the tables are the same as Table 1 and Table 2 of the first embodiment. Therefore, an explanation in this regard will not be provided again.

Figure 2A:
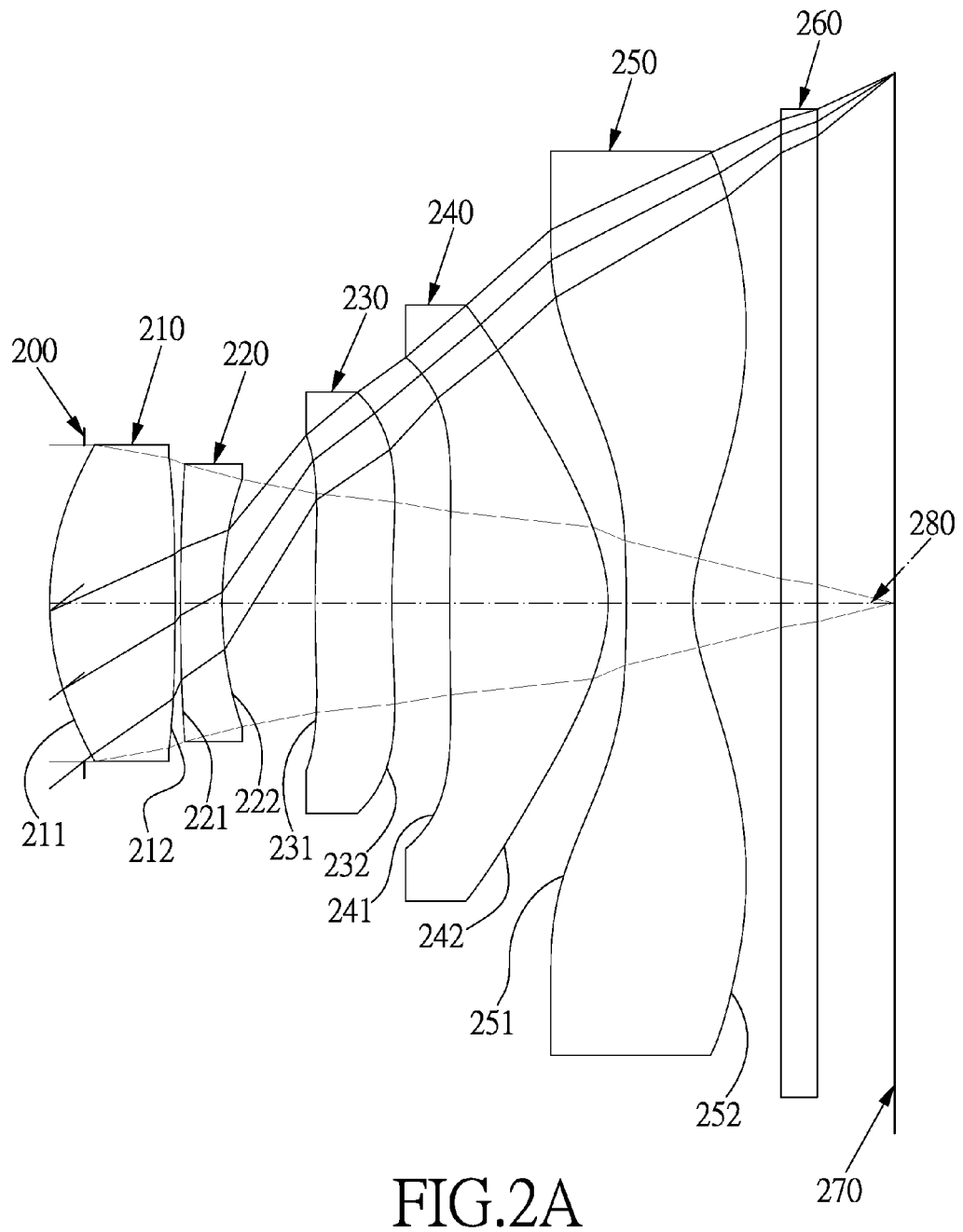
FIG. 2A shows a five-piece optical lens system in accordance with a second embodiment of the present invention.
Figure 2B:
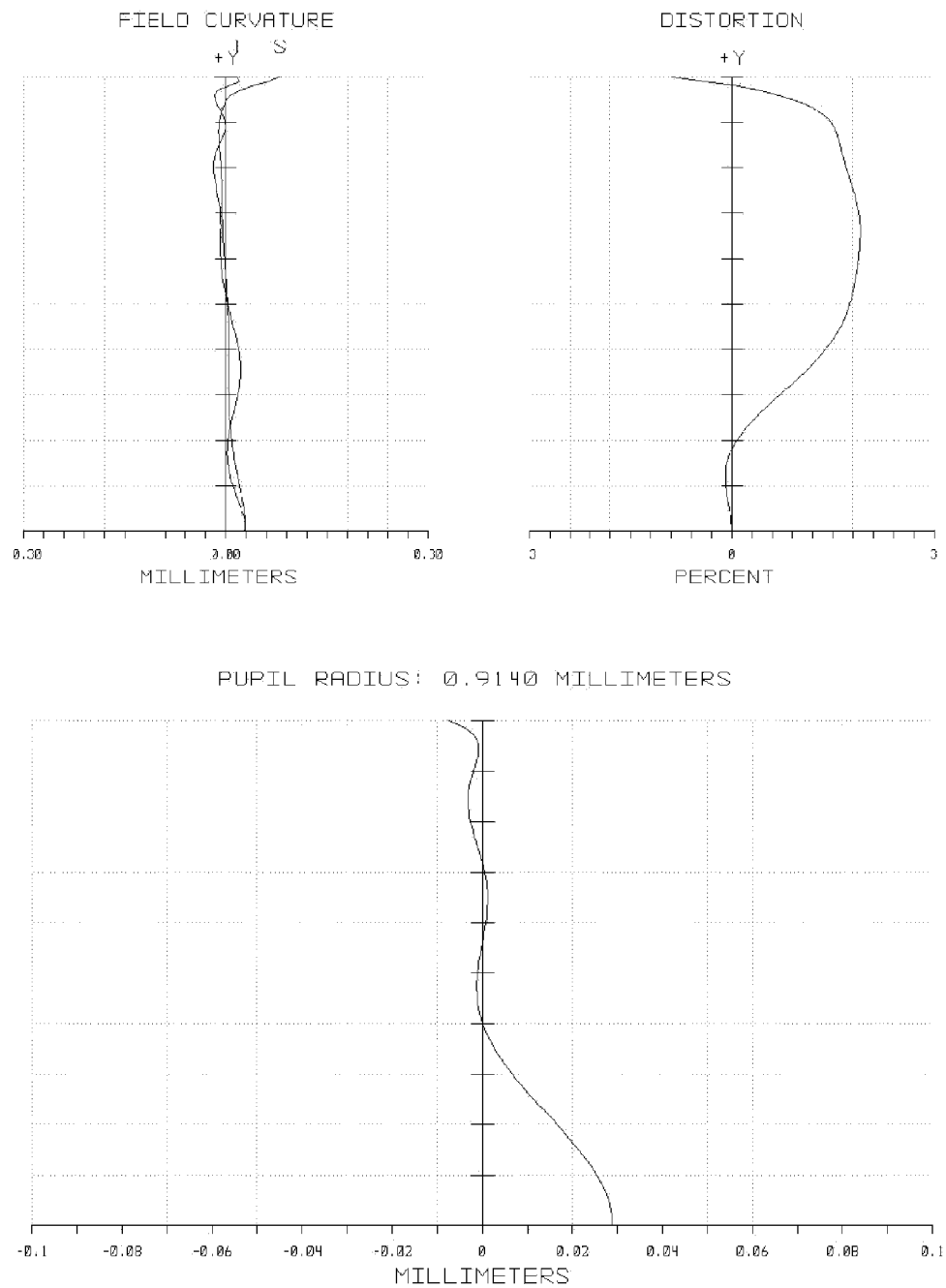
FIG. 2B shows the longitudinal spherical aberration curve, the astigmatic field curve and the distortion curve of the second embodiment of the present invention.

FIG. 2A shows a five-piece optical lens system in accordance with a second embodiment of the present invention, and FIG. 2B shows, in order from left to right, the longitudinal spherical aberration curves, the astigmatic field curves, and the distortion curve of the second embodiment of the present invention. A five-piece optical lens system in accordance with the second embodiment of the present invention comprises, in order from the object side to the image side: a stop 200, a first lens element 210, a second lens element 220, a third lens element 230, a fourth lens element 240, a fifth lens element 250, an IR cut filter 260 and an image plane 270.

The first lens element 210 with a positive refractive power has an object-side surface 211 being convex near an optical axis 280 and an image-side surface 212 being convex near the optical axis 280, the object-side surface 211 and the image-side surface 212 are aspheric, and the first lens element 210 is made of plastic material.

The second lens element 220 with a negative refractive power has an object-side surface 221 being convex near the optical axis 280 and an image-side surface 222 being concave near the optical axis 280, the object-side surface 221 and the image-side surface 222 are aspheric, and the second lens element 220 is made of plastic material.

The third lens element 230 with a negative refractive power has an object-side surface 231 being convex near the optical axis 280 and an image-side surface 232 being concave near the optical axis 280, the object-side surface 231 and the image-side surface 232 are aspheric, the third lens element 230 is made of plastic material, and at least one of the object-side and image-side surfaces 231, 232 of the third lens element 230 has an inflection point.

The fourth lens element 240 with a positive refractive power has an object-side surface 241 being convex near the optical axis 280 and an image-side surface 242 being convex near the optical axis 280, the object-side surface 241 and the image-side surface 242 are aspheric, the fourth lens element 240 is made of plastic material, and at least one of the object-side and image-side surfaces 241, 242 of the fourth lens element 240 has an inflection point.

The fifth lens element 250 with a negative refractive power has an object-side surface 251 being concave near the optical axis 280 and an image-side surface 252 being concave near the optical axis 280, the object-side surface 251 and the image-side surface 252 are aspheric, and the fifth lens element 250 is made of plastic material.

The IR cut filter 260 made of glass is located between the fifth lens element 250 and the image plane 270 and has no influence on the focal length of the five-piece optical lens system.

The equation for the aspheric surface profiles of the second embodiment has the same form as that of the first embodiment. Therefore, an explanation in this regard will not be provided again.

In the second embodiment of the present five-piece optical lens system, the focal length of the five-piece optical lens system is f, the f-number of the five-piece optical lens system is Fno, the field of view of the five-piece optical lens system is 2ω, and they satisfy the relations:

f=3.9144 mm;
Fno=2.0; and
2ω=77°.

In the second embodiment of the present five-piece optical lens system, the focal length of the first lens element 210 is f1, the focal length of the second lens element 220 is f2, and they satisfy the relation:

f1/f2=−0.6210.

In the second embodiment of the present five-piece optical lens system, the focal length of the second lens element 220 is f2, the focal length of the fourth lens element 240 is f4, and they satisfy the relation:

f2/f4=−2.6635.

In the second embodiment of the present five-piece optical lens system, the focal length of the fourth lens element 240 is f4, the focal length of the fifth lens element 250 is f5, and they satisfy the relation:

f4/f5=−1.0875.

In the second embodiment of the present five-piece optical lens system, the focal length of the first lens element 210 is f1, the focal length of the second lens element 220 and the third lens element 230 combined is f23, and they satisfy the relation:

f1/f23=−0.7258.

In the second embodiment of the present five-piece optical lens system, the focal length of the second lens element 220 and the third lens element 230 combined is f23, the focal length of the fourth lens element 240 is f4, and they satisfy the relation:

f23/f4=−2.2790.

In the second embodiment of the present five-piece optical lens system, the focal length of the first lens element 210 is f1, the focal length of the second lens element 220, the third lens element 230 and the fourth lens element 240 combined is f234, and they satisfy the relation:

f1/f234=1.5594.

In the second embodiment of the present five-piece optical lens system, the focal length of the second lens element 220, the third lens element 230 and the fourth lens element 240 combined is f234, the focal length of the fifth lens element 250 is f5, and they satisfy the relation:

f234/f5=−1.1536.

In the second embodiment of the present five-piece optical lens system, the focal length of the first lens element 210 and the second lens element 220 combined is f12, the focal length of the third lens element 230 and the fourth lens element 240 combined is f34, and they satisfy the relation:

f12/f34=3.0399.

In the second embodiment of the present five-piece optical lens system, the focal length of the second lens element 220 is f2, the focal length of the third lens element 230 and the fourth lens element 240 combined is f34, and they satisfy the relation:

f2/f34=−2.5455.

In the second embodiment of the present five-piece optical lens system, the focal length of the third lens element 230 and the fourth lens element 240 combined is f34, the focal length of the fifth lens element 250 is f5, and they satisfy the relation:

f34/f5=−1.1380.

In the second embodiment of the present five-piece optical lens system, the focal length of the first lens element 210 and the second lens element 220 combined is f12, the focal length of the third lens element 230, the fourth lens element 240 and the fifth lens element 250 combined is f345, and they satisfy the relation:

f12/f345=0.3140.

In the second embodiment of the present five-piece optical lens system, the focal length of the first lens element 210, the second lens element 220 and the third lens element 230 combined is f123, the focal length of the fifth lens element 250 is f5, and they satisfy the relation:

f123/f5=−3.7190.

In the second embodiment of the present five-piece optical lens system, the focal length of the five-piece optical lens system is f, the distance from the object-side surface 211 of the first lens element 210 to the image plane 270 along the optical axis 280 is TL, and they satisfy the relation:

f/TL=0.8035.

The detailed optical data of the second embodiment is shown in table 3, and the aspheric surface data is shown in table 4.

TABLE 3

(Embodiment 2)
f(focal length) = 3.9144 mm, Fno = 2.0, 2ω = 77°.

| Surface | | Curvature Radius | Thickness | Material | nd | vd |
|---|---|---|---|---|---|---|
| 0 | Object | Infinity | Infinity | | | |
| 1 | | Infinity | 0.1976384 | | | |
| 2 | STO | Infinity | −0.1976384 | | | |
| 3 | Lens 1 | 1.659301(ASP) | 0.7241446 | Plastic | 1.535 | 56 |
| 4 | | −14.63817(ASP) | 0.03 | | | |
| 5 | Lens 2 | 13.07965(ASP) | 0.24 | Plastic | 1.634 | 23.9 |
| 6 | | 2.360035 (ASP) | 0.5361574 | | | |
| 7 | Lens 3 | 6.932691(ASP) | 0.4432523 | Plastic | 1.535 | 56 |
| 8 | | 5.010382(ASP) | 0.3329447 | | | |
| 9 | Lens 4 | 13.22489(ASP) | 0.9138215 | Plastic | 1.535 | 56 |
| 10 | | −0.9595299(ASP) | 0.1040591 | | | |

TABLE 3-continued (Embodiment 2)
f(focal length) = 3.9144 mm, Fno = 2.0, 2ω = 77°.

| Surface | | Curvature Radius | Thickness | Material | nd | vd |
|---|---|---|---|---|---|---|
| 11 | Lens 5 | −17.69331(ASP) | 0.385 | Plastic | 1.535 | 56 |
| 12 | | 0.8903007(ASP) | 0.5073411 | | | |
| 13 | IR-filter | Infinity | 0.21 | Glass | 1.5168 | 64.16734 |
| 14 | | Infinity | 0.4448469 | | | |
| 15 | Image | Infinity | | | | |

TABLE 4

Aspheric Coefficients

| Surface | 3 | 4 | 5 | 6 | 7 |
|---|---|---|---|---|---|
| K = | −1.8021 | 187.9431 | 9.185283 | −1.65179 | −18.0161 |
| A = | 0.045037 | −0.09208 | −0.12183 | −0.04063 | −0.13867 |
| B = | −0.00561 | 0.550246 | 0.63131 | 0.294828 | 0.041908 |
| C = | −0.02267 | −1.30078 | −1.26569 | −0.4391 | −0.0274 |
| D = | 0.06241 | 1.4325 | 1.19943 | 0.377944 | −0.02967 |
| E = | −0.0857 | −0.80703 | −0.50922 | −0.11544 | 0.039413 |
| F = | 0.28732 | 0.189991 | 0.073275 | 0.00122 | −0.01743 |

| Surface | 8 | 9 | 10 | 11 | 12 |
|---|---|---|---|---|---|
| K = | −185.258 | 1.240549 | −4.94696 | −107.124 | −5.97754 |
| A = | −0.02524 | −0.06789 | −0.09955 | −0.1846 | −0.09078 |
| B = | −0.16663 | 0.049419 | 0.075173 | 0.093988 | 0.038528 |
| C = | 0.212176 | −0.04845 | −0.02583 | −0.0214 | −0.01049 |
| D = | −0.19507 | 0.012817 | 0.004022 | 0.002659 | 0.001636 |
| E = | 0.094001 | −0.0014 | −2.76E−04 | −1.78E−04 | −1.29E−04 |
| F = | −0.01887 | 5.59E−05 | 6.94E−06 | 5.01E−06 | 3.90E−06 |

Figure 3A:
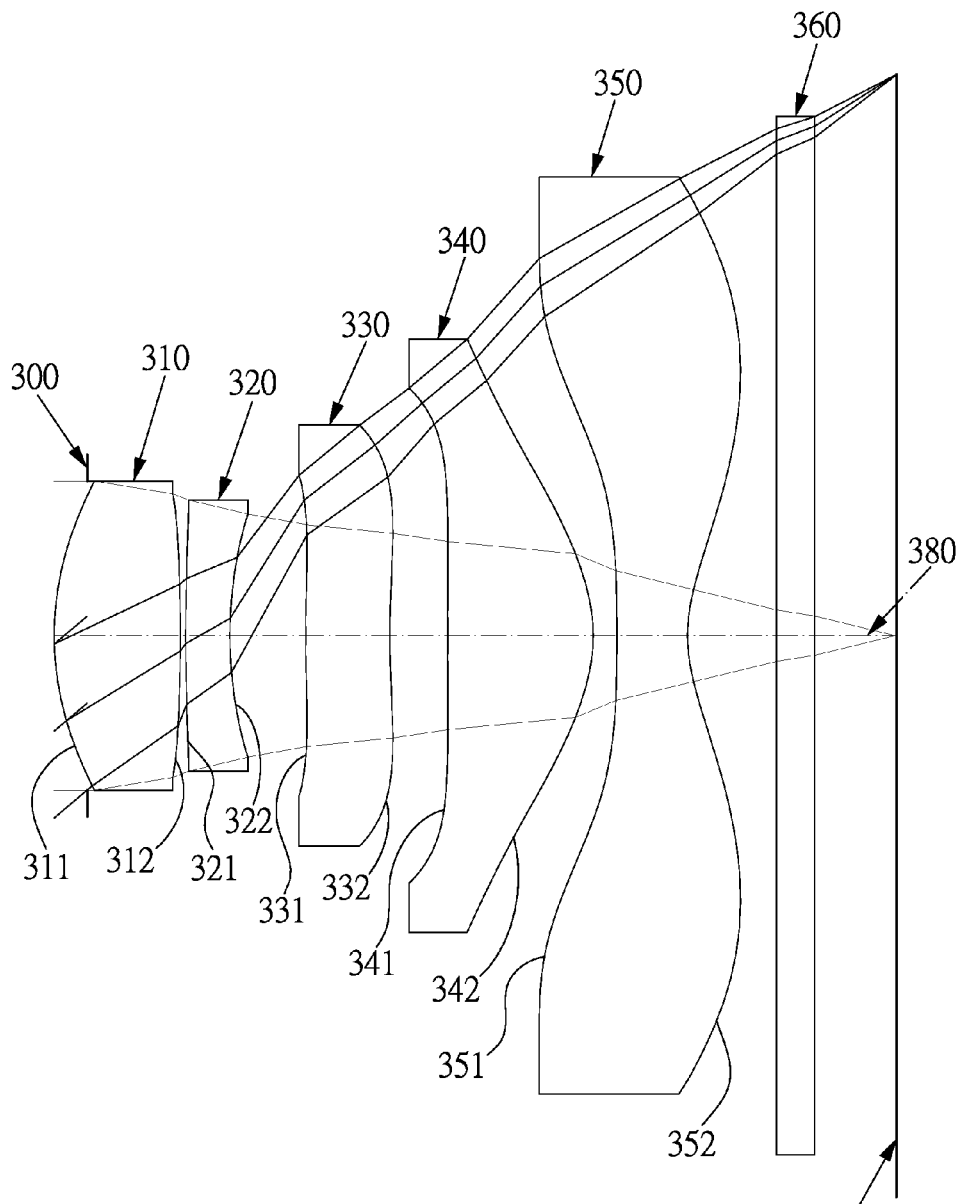
FIG. 3A shows a five-piece optical lens system in accordance with a third embodiment of the present invention.
Figure 3B:
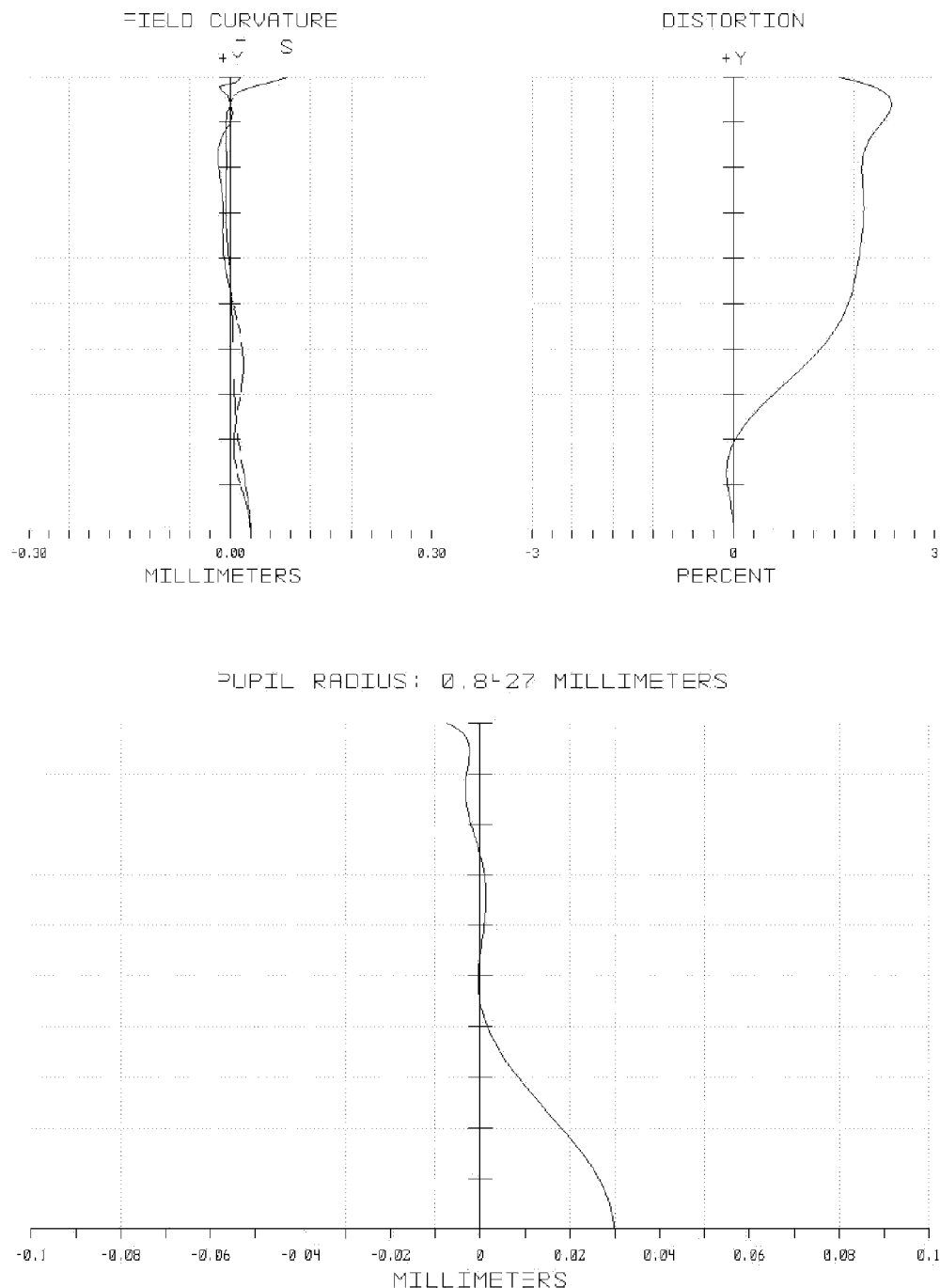
FIG. 3B shows the longitudinal spherical aberration curve, the astigmatic field curve and the distortion curve of the third embodiment of the present invention.

FIG. 3A shows a five-piece optical lens system in accordance with a third embodiment of the present invention, and FIG. 2B shows, in order from left to right, the longitudinal spherical aberration curves, the astigmatic field curves, and the distortion curve of the third embodiment of the present invention. A five-piece optical lens system in accordance with the third embodiment of the present invention comprises, in order from the object side to the image side: a stop 300, a first lens element 310, a second lens element 320, a third lens element 330, a fourth lens element 340, a fifth lens element 350, an IR cut filter 360 and an image plane 370.

The first lens element 310 with a positive refractive power has an object-side surface 311 being convex near an optical axis 380 and an image-side surface 312 being convex near the optical axis 380, the object-side surface 311 and the image-side surface 312 are aspheric, and the first lens element 310 is made of plastic material.

The second lens element 320 with a negative refractive power has an object-side surface 321 being convex near the optical axis 380 and an image-side surface 322 being concave near the optical axis 380, the object-side surface 321 and the image-side surface 322 are aspheric, and the second lens element 320 is made of plastic material.

The third lens element 330 with a negative refractive power has an object-side surface 331 being convex near the optical axis 380 and an image-side surface 332 being concave near the optical axis 380, the object-side surface 331 and the image-side surface 332 are aspheric, the third lens element 330 is made of plastic material, and at least one of the object-side and image-side surfaces 331, 332 of the third lens element 330 has an inflection point.

The fourth lens element 340 with a positive refractive power has an object-side surface 341 being convex near the optical axis 380 and an image-side surface 342 being convex near the optical axis 380, the object-side surface 341 and the image-side surface 342 are aspheric, the fourth lens element 340 is made of plastic material, and at least one of the object-side and image-side surfaces 341, 342 of the fourth lens element 340 has an inflection point.

The fifth lens element 350 with a negative refractive power has an object-side surface 351 being concave near the optical axis 380 and an image-side surface 352 being concave near the optical axis 380, the object-side surface 351 and the image-side surface 352 are aspheric, and the fifth lens element 350 is made of plastic material.

The IR cut filter 360 made of glass is located between the fifth lens element 350 and the image plane 370 and has no influence on the focal length of the five-piece optical lens system.

The equation for the aspheric surface profiles of the third embodiment has the same form as that of the first embodiment. Therefore, an explanation in this regard will not be provided again.

In the third embodiment of the present five-piece optical lens system, the focal length of the five-piece optical lens system is f, the f-number of the five-piece optical lens system is Fno, the field of view of the five-piece optical lens system is 2ω, and they satisfy the relations:

f=3.6087 mm;
Fno=2.0; and
2ω=80°.

In the third embodiment of the present five-piece optical lens system, the focal length of the first lens element 310 is f1, the focal length of the second lens element 320 is f2, and they satisfy the relation:

f1/f2=−0.6057.

In the third embodiment of the present five-piece optical lens system, the focal length of the second lens element 320 is f2, the focal length of the fourth lens element 340 is f4, and they satisfy the relation:

f2/f4=−2.8171.

In the third embodiment of the present five-piece optical lens system, the focal length of the fourth lens element 340 is f4, the focal length of the fifth lens element 350 is f5, and they satisfy the relation:

f4/f5=−1.0535.

In the third embodiment of the present five-piece optical lens system, the focal length of the first lens element 310 is f1, the focal length of the second lens element 320 and the third lens element 330 combined is f23, and they satisfy the relation:

f1/f23=−0.7217.

In the third embodiment of the present five-piece optical lens system, the focal length of the second lens element 320 and the third lens element 330 combined is f23, the focal length of the fourth lens element 340 is f4, and they satisfy the relation:

f23/f4=−2.3641.

In the third embodiment of the present five-piece optical lens system, the focal length of the first lens element 310 is f1, the focal length of the second lens element 320, the third lens element 330 and the fourth lens element 340 combined is f234, and they satisfy the relation:

f1/f234=1.5523.

In the third embodiment of the present five-piece optical lens system, the focal length of the second lens element 320, the third lens element 330 and the fourth lens element 340combined is f234, the focal length of the fifth lens element 350 is f5, and they satisfy the relation:

f234/f5=−1.1579.

In the third embodiment of the present five-piece optical lens system, the focal length of the first lens element 310 and the second lens element 320 combined is f12, the focal length of the third lens element 330 and the fourth lens element 340 combined is f34, and they satisfy the relation:

f12/f34=3.0618.

In the third embodiment of the present five-piece optical lens system, the focal length of the second lens element 320 is f2, the focal length of the third lens element 330 and the fourth lens element 340 combined is f34, and they satisfy the relation:

f2/f34=−2.6806.

In the third embodiment of the present five-piece optical lens system, the focal length of the third lens element 330 and the fourth lens element 340 combined is f34, the focal length of the fifth lens element 350 is f5, and they satisfy the relation:

f34/f5=−1.1071.

In the third embodiment of the present five-piece optical lens system, the focal length of the first lens element 310 and the second lens element 320 combined is f12, the focal length of the third lens element 330, the fourth lens element 340 and the fifth lens element 350 combined is f345, and they satisfy the relation:

f12/f345=0.4290.

In the third embodiment of the present five-piece optical lens system, the focal length of the first lens element 310, the second lens element 320 and the third lens element 330 combined is f123, the focal length of the fifth lens element 350 is f5, and they satisfy the relation:

f123/f5=−3.7082.

In the third embodiment of the present five-piece optical lens system, the focal length of the five-piece optical lens system is f, the distance from the object-side surface 311 of the first lens element 310 to the image plane 370 along the optical axis 380 is TL, and they satisfy the relation:

f/TL=0.7869.

The detailed optical data of the third embodiment is shown in table 5, and the aspheric surface data is shown in table 6.

TABLE 5

(Embodiment 3)
f(focal length) = 3.6087 mm, Fno = 2.0, 2ω = 80°.

| Surface | | Curvature Radius | Thickness | Material | nd | vd |
|---|---|---|---|---|---|---|
| 0 | Object | Infinity | Infinity | | | |
| 1 | | Infinity | 0.1787594 | | | |
| 2 | STO | Infinity | −0.1787594 | | | |
| 3 | Lens 1 | 1.649722(ASP) | 0.6863757 | Plastic | 1.535 | 56 |
| 4 | | −13.84601(ASP) | 0.03 | | | |
| 5 | Lens 2 | 10.24513(ASP) | 0.24 | Plastic | 1.634 | 23.9 |
| 6 | | 2.267162(ASP) | 0.4131925 | | | |
| 7 | Lens 3 | 7.176481(ASP) | 0.4585032 | Plastic | 1.535 | 56 |
| 8 | | 4.916248(ASP) | 0.3137569 | | | |
| 9 | Lens 4 | 23.33019(ASP) | 0.7933624 | Plastic | 1.535 | 56 |
| 10 | | −0.9010017(ASP) | 0.1278191 | | | |
| 11 | Lens 5 | −30.01446(ASP) | 0.3852372 | Plastic | 1.535 | 56 |
| 12 | | 0.8606299(ASP) | 0.483126 | | | |
| 13 | IR-filter | Infinity | 0.21 | Glass | 1.5168 | 64.16734 |
| 14 | | Infinity | 0.4448469 | | | |
| 15 | Image | Infinity | | | | |

TABLE 6

Aspheric Coefficients

| Surface | 3 | 4 | 5 | 6 | 7 |
|---|---|---|---|---|---|
| K = | −2.02497 | 187.9431 | 9.185283 | −2.26276 | −18.0161 |
| A = | 0.051647 | −0.1423 | −0.18442 | −0.06864 | −0.16541 |
| B = | −0.01557 | 0.84617 | 0.949502 | 0.401044 | 0.05565 |
| C = | −0.01888 | −2.3897 | −2.33062 | −0.67116 | −0.02218 |
| D = | 0.079419 | 3.16729 | 2.76445 | 0.602489 | −0.05591 |
| E = | −0.14968 | −2.11041 | −1.54777 | −0.19316 | 0.061619 |
| F = | 0.060815 | 0.570129 | 0.331452 | 0.003117 | −0.03309 |

| Surface | 8 | 9 | 10 | 11 | 12 |
|---|---|---|---|---|---|
| K = | −185.258 | 1.240549 | −4.59517 | −107.124 | −5.96311 |
| A = | −0.03071 | −0.06826 | −0.12176 | −0.18248 | −0.09425 |
| B = | −0.16449 | 0.072174 | 0.107645 | 0.086686 | 0.036561 |
| C = | 0.197799 | −0.06987 | −0.0371 | −0.0173 | −0.00915 |
| D = | −0.18724 | 0.019143 | 0.005869 | 0.001697 | 0.001193 |
| E = | 0.091785 | −0.00218 | −4.17E−04 | −7.78E−05 | −6.39E−05 |
| F = | −0.01906 | 9.06E−05 | 1.09E−05 | 1.29E−06 | 3.86E−07 |

Figure 4A:
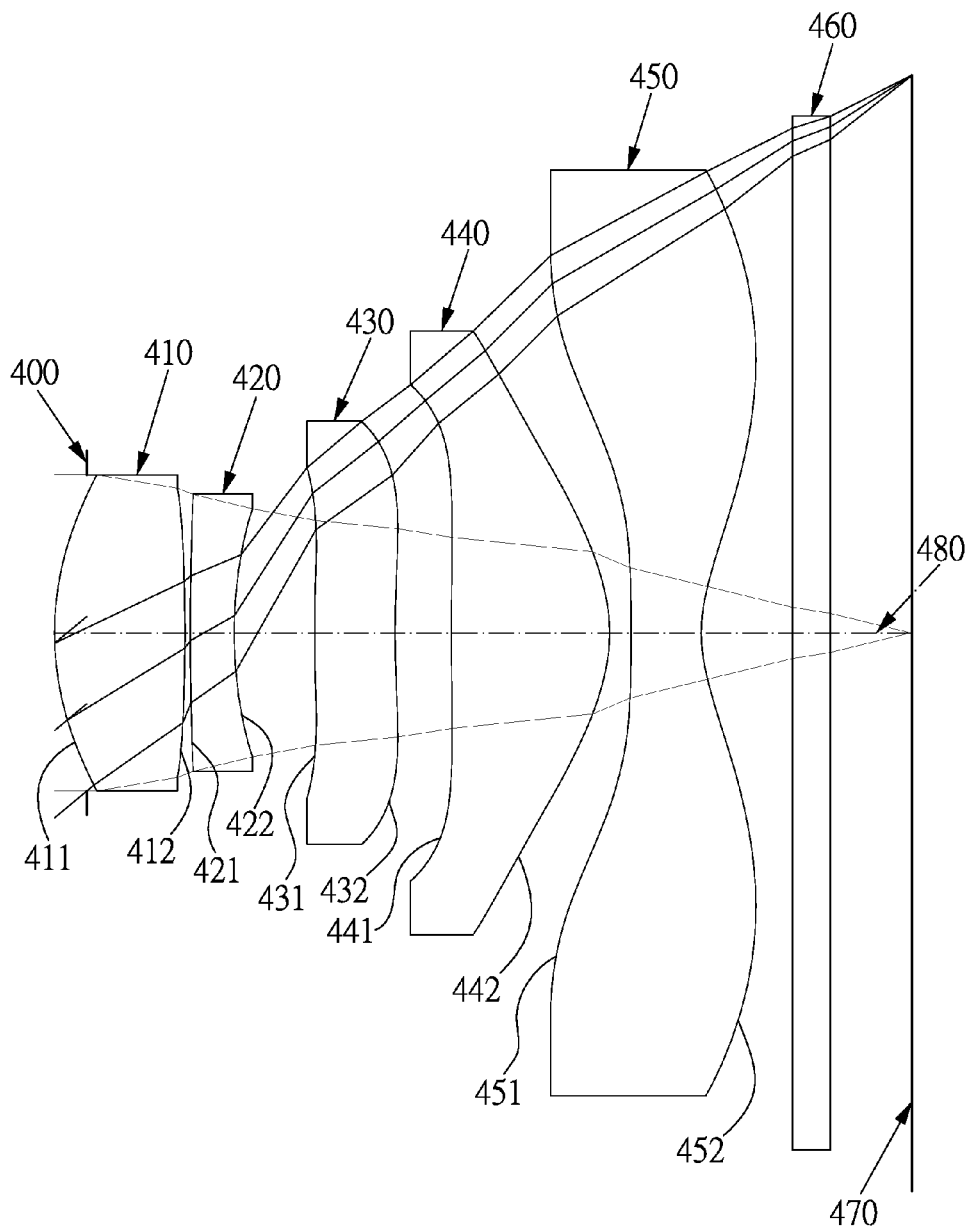
FIG. 4A shows a five-piece optical lens system in accordance with a fourth embodiment of the present invention.
Figure 4B:
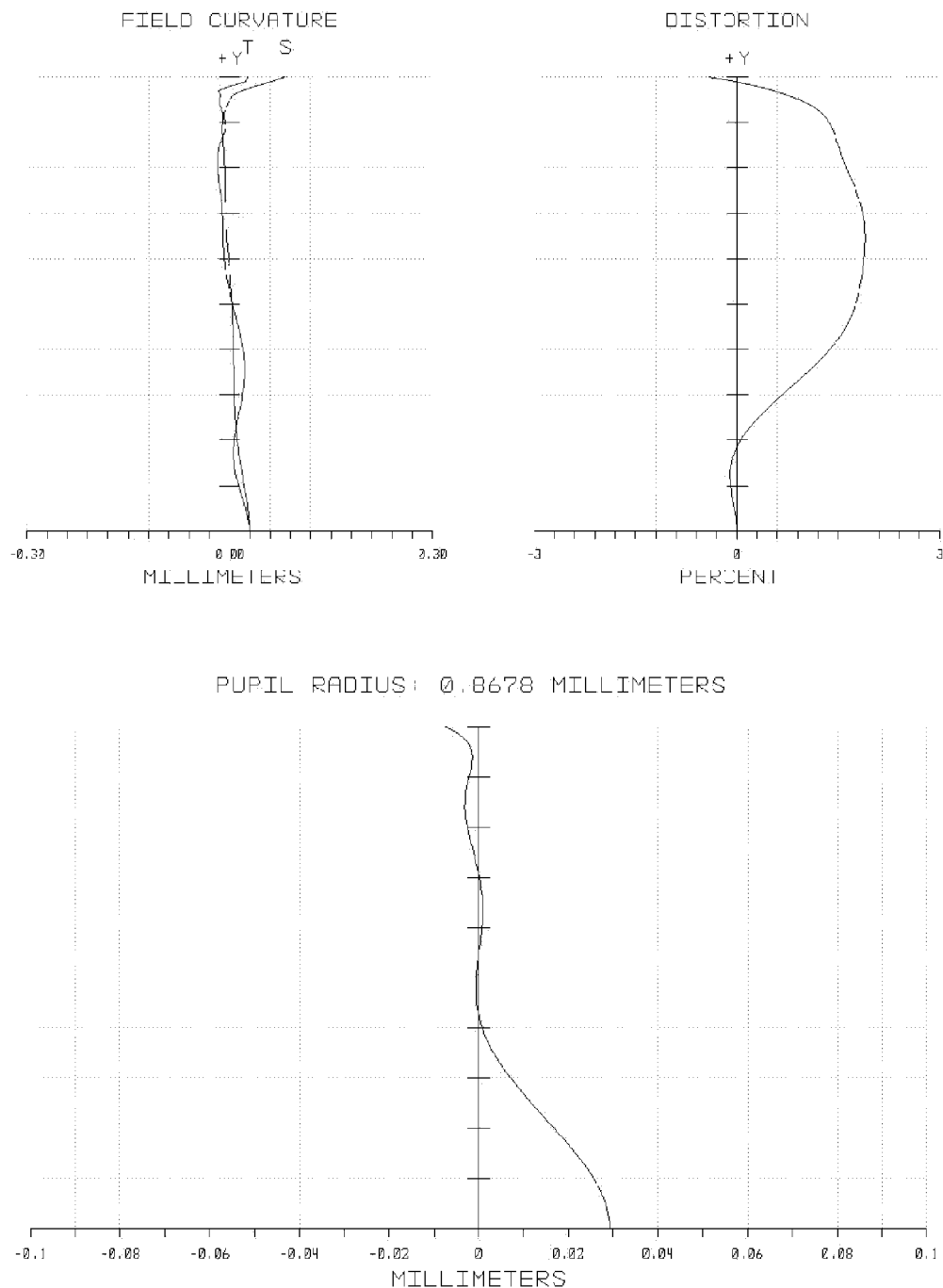
FIG. 4B shows the longitudinal spherical aberration curve, the astigmatic field curve and the distortion curve of the fourth embodiment of the present invention.

FIG. 4A shows a five-piece optical lens system in accordance with a fourth embodiment of the present invention, and FIG. 4B shows, in order from left to right, the longitudinal spherical aberration curves, the astigmatic field curves, and the distortion curve of the fourth embodiment of the present invention. A five-piece optical lens system in accordance with the fourth embodiment of the present invention comprises, in order from the object side to the image side: a stop 400, a first lens element 410, a second lens element 420, a third lens element 430, a fourth lens element 440, a fifth lens element 450, an IR cut filter 460 and an image plane 470.

The first lens element 410 with a positive refractive power has an object-side surface 411 being convex near an optical axis 480 and an image-side surface 412 being convex near the optical axis 480, the object-side surface 411 and the image-side surface 412 are aspheric, and the first lens element 410 is made of plastic material.

The second lens element 420 with a negative refractive power has an object-side surface 421 being convex near the optical axis 480 and an image-side surface 422 being concave near the optical axis 480, the object-side surface 421 and the image-side surface 422 are aspheric, and the second lens element 420 is made of plastic material.

The third lens element 430 with a negative refractive power has an object-side surface 431 being convex near the optical axis 480 and an image-side surface 432 being concave near the optical axis 480, the object-side surface 431 and the image-side surface 432 are aspheric, the third lens element 430 is made of plastic material, and at least one of the object-side and image-side surfaces 431, 432 of the third lens element 430 has an inflection point.

The fourth lens element 440 with a positive refractive power has an object-side surface 441 being convex near the optical axis 480 and an image-side surface 442 being convex near the optical axis 480, the object-side surface 441 and the image-side surface 442 are aspheric, the fourth lens element 440 is made of plastic material, and at least one of the object-side and image-side surfaces 441, 442 of the fourth lens element 440 has an inflection point.

The fifth lens element 450 with a negative refractive power has an object-side surface 451 being concave near the optical axis 480 and an image-side surface 452 being concave near the optical axis 480, the object-side surface 451 and the image-side surface 452 are aspheric, and the fifth lens element 450 is made of plastic material.

The IR cut filter 460 made of glass is located between the fifth lens element 450 and the image plane 470 and has no influence on the focal length of the five-piece optical lens system.

The equation for the aspheric surface profiles of the fourth embodiment has the same form as that of the first embodiment. Therefore, an explanation in this regard will not be provided again.

In the fourth embodiment of the present five-piece optical lens system, the focal length of the five-piece optical lens system is f, the f-number of the five-piece optical lens system is Fno, the field of view of the five-piece optical lens system is 2ω, and they satisfy the relations:

f=3.7166 mm;
Fno=2.0; and
2ω=80°.

In the fourth embodiment of the present five-piece optical lens system, the focal length of the first lens element 410 is f1, the focal length of the second lens element 420 is f2, and they satisfy the relation:

f1/f2=−0.6087.

In the fourth embodiment of the present five-piece optical lens system, the focal length of the second lens element 420 is f2, the focal length of the fourth lens element 440 is f4, and they satisfy the relation:

f2/f4=−2.7711.

In the fourth embodiment of the present five-piece optical lens system, the focal length of the fourth lens element 440 is f4, the focal length of the fifth lens element 450 is f5, and they satisfy the relation:

f4/f5=−1.0700.

In the fourth embodiment of the present five-piece optical lens system, the focal length of the first lens element 410 is f1, the focal length of the second lens element 420 and the third lens element 430 combined is f23, and they satisfy the relation:

f1/f23=−0.7214.

In the fourth embodiment of the present five-piece optical lens system, the focal length of the second lens element 420 and the third lens element 430 combined is f23, the focal length of the fourth lens element 440 is f4, and they satisfy the relation:

f23/f4=−2.3380.

In the fourth embodiment of the present five-piece optical lens system, the focal length of the first lens element 410 is f1, the focal length of the second lens element 420, the third lens element 430 and the fourth lens element 440 combined is f234, and they satisfy the relation:

f1/f234=1.5521.

In the fourth embodiment of the present five-piece optical lens system, the focal length of the second lens element 420, the third lens element 430 and the fourth lens element 440 combined is f234, the focal length of the fifth lens element 450 is f5, and they satisfy the relation:

f234/f5=−1.1628.

In the fourth embodiment of the present five-piece optical lens system, the focal length of the first lens element 410 and the second lens element 420 combined is f12, the focal length of the third lens element 430 and the fourth lens element 440 combined is f34, and they satisfy the relation:

f12/f34=3.0485.

In the fourth embodiment of the present five-piece optical lens system, the focal length of the second lens element 420 is f2, the focal length of the third lens element 430 and the fourth lens element 440 combined is f34, and they satisfy the relation:

f2/f34=−2.6424.

In the fourth embodiment of the present five-piece optical lens system, the focal length of the third lens element 430 and the fourth lens element 440 combined is f34, the focal length of the fifth lens element 450 is f5, and they satisfy the relation:

f34/f5=−1.1221.

In the fourth embodiment of the present five-piece optical lens system, the focal length of the first lens element 410 and the second lens element 420 combined is f12, the focal length of the third lens element 430, the fourth lens element 440 and the fifth lens element 450 combined is f345, and they satisfy the relation:

f12/f345=0.3803.

In the fourth embodiment of the present five-piece optical lens system, the focal length of the first lens element 410, the second lens element 420 and the third lens element 430 combined is f123, the focal length of the fifth lens element 450 is f5, and they satisfy the relation:

f123/f5=−3.7301.

In the fourth embodiment of the present five-piece optical lens system, the focal length of the five-piece optical lens system is f, the distance from the object-side surface 411 of the first lens element 410 to the image plane 470 along the optical axis 480 is TL, and they satisfy the relation:

f/TL=0.7910.

The detailed optical data of the fourth embodiment is shown in table 7, and the aspheric surface data is shown in table 8.

TABLE 7

(Embodiment 4)
f(focal length) = 3.7166 mm, Fno = 2.0, 2ω = 80°.

| Surface | | Curvature Radius | Thickness | Material | nd | vd |
|---|---|---|---|---|---|---|
| 0 | Object | Infinity | Infinity | | | |
| 1 | | Infinity | 0.1764522 | | | |
| 2 | STO | Infinity | −0.1764522 | | | |
| 3 | Lens 1 | 1.655514(ASP) | 0.714815 | Plastic | 1.535 | 56 |
| 4 | | −14.09168(ASP) | 0.03 | | | |
| 5 | Lens 2 | 15.7841(ASP) | 0.24 | Plastic | 1.634 | 23.9 |
| 6 | | 2.468699(ASP) | 0.4416591 | | | |
| 7 | Lens 3 | 7.157455(ASP) | 0.4405086 | Plastic | 1.535 | 56 |
| 8 | | 4.968784(ASP) | 0.3085269 | | | |
| 9 | Lens 4 | 15.38548(ASP) | 0.8675195 | Plastic | 1.535 | 56 |
| 10 | | −0.9287408(ASP) | 0.117756 | | | |
| 11 | Lens 5 | −25.01855(ASP) | 0.385 | Plastic | 1.535 | 56 |
| 12 | | 0.8674655(ASP) | 0.4979071 | | | |
| 13 | IR-filter | Infinity | 0.21 | Glass | 1.5168 | 64.16734 |
| 14 | | Infinity | 0.4448469 | | | |
| 15 | Image | Infinity | | | | |

TABLE 8

Aspheric Coefficients

| Surface | 3 | 4 | 5 | 6 | 7 |
|---|---|---|---|---|---|
| K = | −1.99006 | 187.9431 | 9.185283 | −1.77149 | −18.0161 |
| A = | 0.049904 | −0.12279 | −0.13841 | −0.04136 | −0.16381 |
| B = | −0.01771 | 0.706791 | 0.768297 | 0.331141 | 0.084412 |
| C = | 9.31E−04 | −1.90316 | −1.7778 | −0.52741 | −0.11722 |
| D = | 0.030556 | 2.38977 | 1.93462 | 0.441118 | 0.097518 |
| E = | −0.08494 | −1.51513 | −0.95801 | −0.10248 | −0.06451 |
| F = | 0.035262 | 0.397138 | 0.172602 | −0.01786 | 0.013475 |

| Surface | 8 | 9 | 10 | 11 | 12 |
|---|---|---|---|---|---|
| K = | −185.258 | 1.240549 | −4.75585 | −107.124 | −5.906 |
| A = | −0.04172 | −0.07341 | −0.11288 | −0.19352 | −0.0947 |
| B = | −0.14899 | 0.06433 | 0.091296 | 0.096972 | 0.039432 |
| C = | 0.18573 | −0.0636 | −0.03035 | −0.02118 | −0.01061 |
| D = | −0.18421 | 0.017596 | 0.004469 | 0.002396 | 0.001604 |
| E = | 0.094438 | −0.00201 | −2.92E−04 | −1.38E−04 | −1.21E−04 |
| F = | −0.0205 | 8.43E−05 | 7.05E−06 | 3.19E−06 | 3.35E−06 |

Figure 5A:
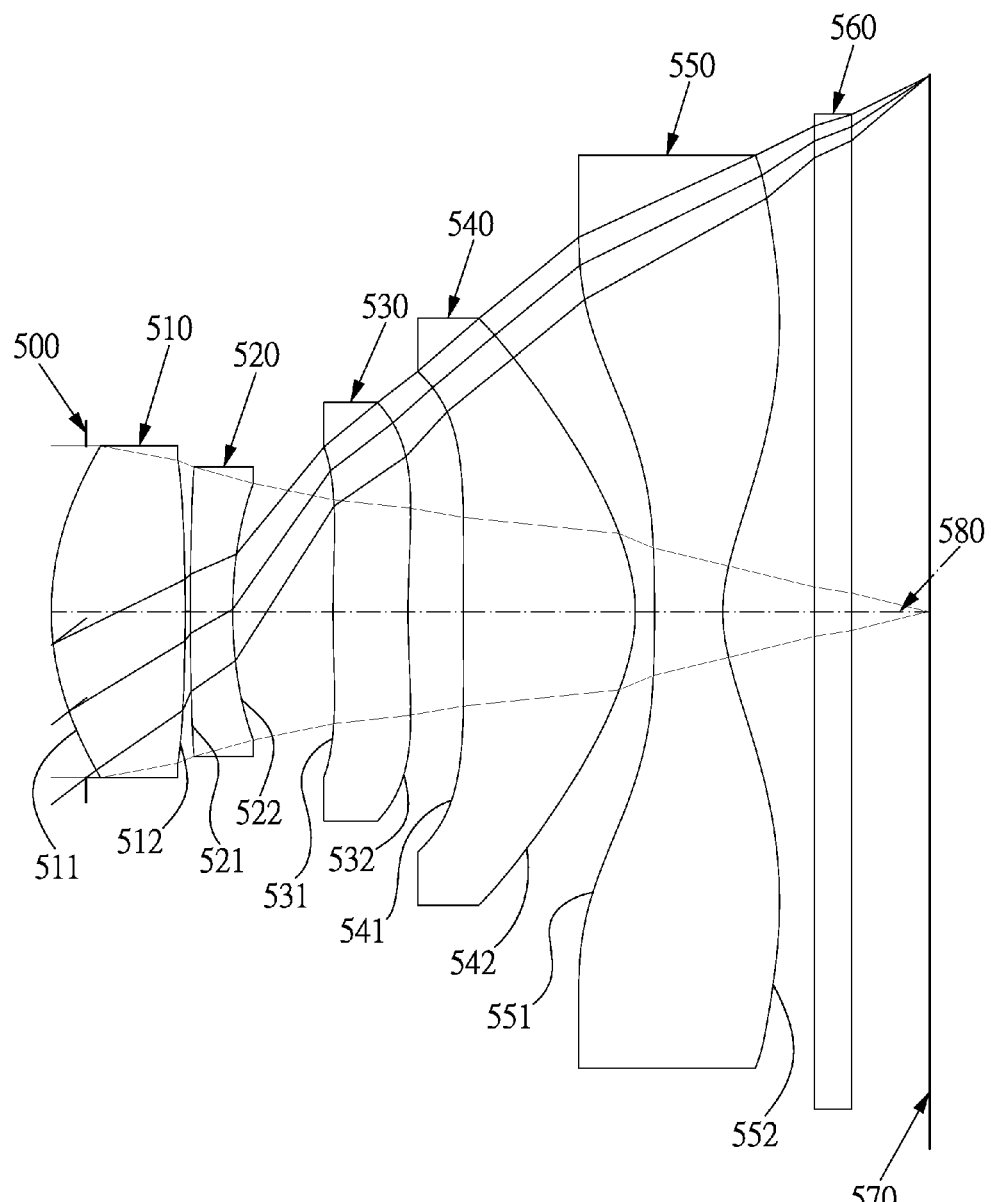
FIG. 5A shows a five-piece optical lens system in accordance with a fifth embodiment of the present invention.
Figure 5B:
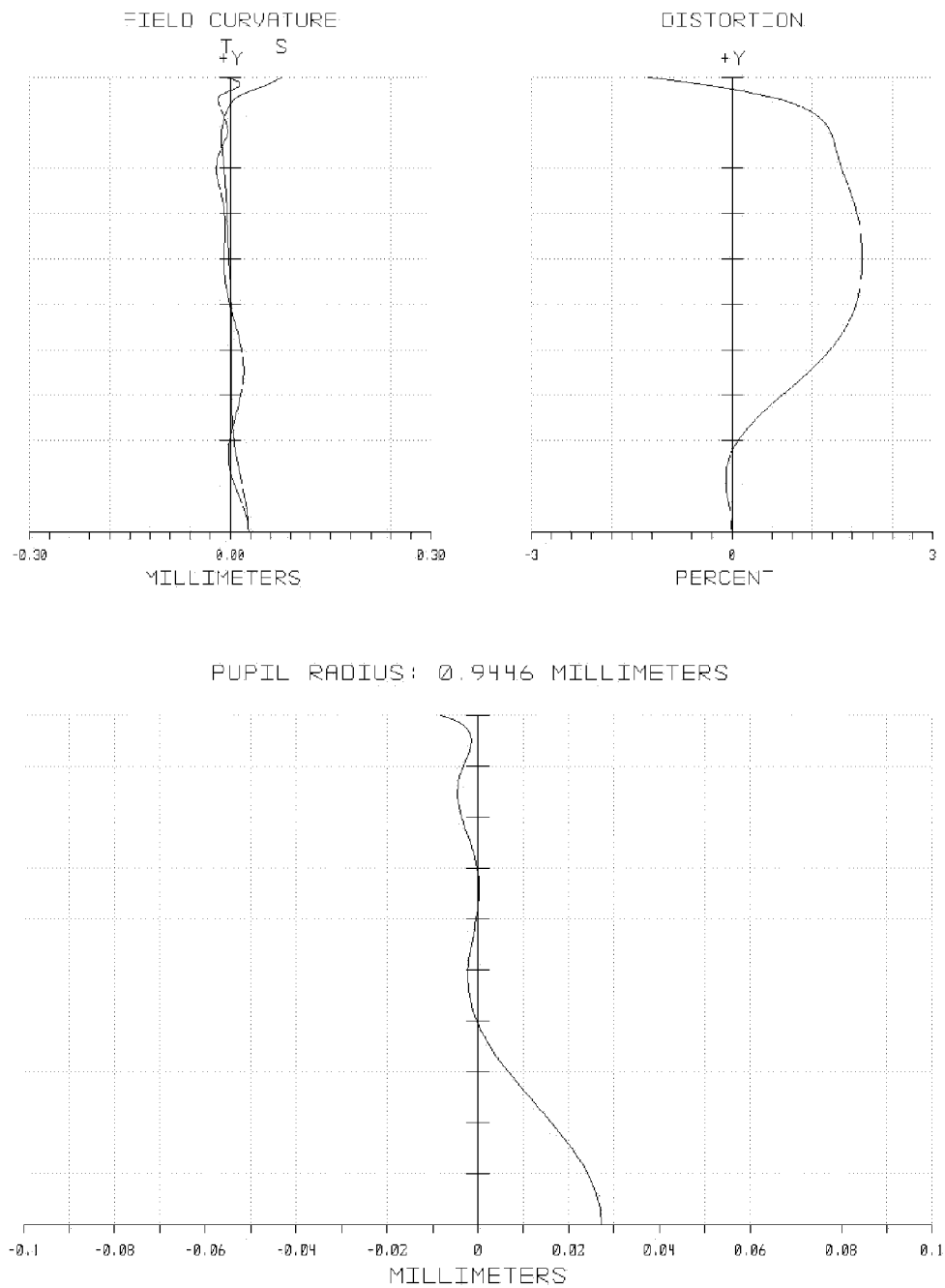
FIG. 5B shows the longitudinal spherical aberration curve, the astigmatic field curve and the distortion curve of the fifth embodiment of the present invention.

FIG. 5A shows a five-piece optical lens system in accordance with a fifth embodiment of the present invention, and FIG. 5B shows, in order from left to right, the longitudinal spherical aberration curves, the astigmatic field curves, and the distortion curve of the fifth embodiment of the present invention. A five-piece optical lens system in accordance with the fifth embodiment of the present invention comprises, in order from the object side to the image side: a stop 500, a first lens element 510, a second lens element 520, a third lens element 530, a fourth lens element 540, a fifth lens element 550, an IR cut filter 560 and an image plane 570.

The first lens element 510 with a positive refractive power has an object-side surface 511 being convex near an optical axis 580 and an image-side surface 512 being convex near the optical axis 580, the object-side surface 511 and the image-side surface 512 are aspheric, and the first lens element 510 is made of plastic material.

The second lens element 520 with a negative refractive power has an object-side surface 521 being convex near the optical axis 580 and an image-side surface 522 being concave near the optical axis 580, the object-side surface 521 and the image-side surface 522 are aspheric, and the second lens element 520 is made of plastic material.

The third lens element 530 with a negative refractive power has an object-side surface 531 being convex near the optical axis 580 and an image-side surface 532 being concave near the optical axis 580, the object-side surface 531 and the image-side surface 532 are aspheric, the third lens element 530 is made of plastic material, and at least one of the object-side and image-side surfaces 531, 532 of the third lens element 530 has an inflection point.

The fourth lens element 540 with a positive refractive power has an object-side surface 541 being convex near the optical axis 580 and an image-side surface 542 being convex near the optical axis 580, the object-side surface 541 and the image-side surface 542 are aspheric, the fourth lens element 540 is made of plastic material, and at least one of the object-side and image-side surfaces 541, 542 of the fourth lens element 540 has an inflection point.

The fifth lens element 550 with a negative refractive power has an object-side surface 551 being concave near the optical axis 580 and an image-side surface 552 being concave near the optical axis 580, the object-side surface 551 and the image-side surface 552 are aspheric, and the fifth lens element 550 is made of plastic material.

The IR cut filter 560 made of glass is located between the fifth lens element 550 and the image plane 570 and has no influence on the focal length of the five-piece optical lens system.

The equation for the aspheric surface profiles of the fifth embodiment has the same form as that of the first embodiment. Therefore, an explanation in this regard will not be provided again.

In the fifth embodiment of the present five-piece optical lens system, the focal length of the five-piece optical lens system is f, the f-number of the five-piece optical lens system is Fno, the field of view of the five-piece optical lens system is 2ω, and they satisfy the relations:
f=4.0454 mm;
Fno=2.0; and
2ω=75°.

In the fifth embodiment of the present five-piece optical lens system, the focal length of the first lens element 510 is f1, the focal length of the second lens element 520 is f2, and they satisfy the relation:
f1/f2=−0.6170.

In the fifth embodiment of the present five-piece optical lens system, the focal length of the second lens element 520 is f2, the focal length of the fourth lens element 540 is f4, and they satisfy the relation:
f2/f4=−2.6123.

In the fifth embodiment of the present five-piece optical lens system, the focal length of the fourth lens element 540 is f4, the focal length of the fifth lens element 550 is f5, and they satisfy the relation:
f4/f5=−1.0805.

In the fifth embodiment of the present five-piece optical lens system, the focal length of the first lens element 510 is f1, the focal length of the second lens element 520 and the third lens element 530 combined is f23, and they satisfy the relation:
f1/f23=−0.7391.

In the fifth embodiment of the present five-piece optical lens system, the focal length of the second lens element 520 and the third lens element 530 combined is f23, the focal length of the fourth lens element 540 is f4, and they satisfy the relation:
f23/f4=−2.1808.

In the fifth embodiment of the present five-piece optical lens system, the focal length of the first lens element 510 is f1, the focal length of the second lens element 520, the third lens element 530 and the fourth lens element 540 combined is f234, and they satisfy the relation:
f1/f234=1.5251.

In the fifth embodiment of the present five-piece optical lens system, the focal length of the second lens element 520, the third lens element 530 and the fourth lens element 540 combined is f234, the focal length of the fifth lens element 550 is f5, and they satisfy the relation:
f234/f5=−1.1419.

In the fifth embodiment of the present five-piece optical lens system, the focal length of the first lens element 510 and the second lens element 520 combined is f12, the focal length of the third lens element 530 and the fourth lens element 540 combined is f34, and they satisfy the relation:
f12/f34=2.9181.

In the fifth embodiment of the present five-piece optical lens system, the focal length of the second lens element 520 is f2, the focal length of the third lens element 530 and the fourth lens element 540 combined is f34, and they satisfy the relation:
f2/f34=−2.4911.

In the fifth embodiment of the present five-piece optical lens system, the focal length of the third lens element 530 and the fourth lens element 540 combined is f34, the focal length of the fifth lens element 550 is f5, and they satisfy the relation:
f34/f5=−1.1331.

In the fifth embodiment of the present five-piece optical lens system, the focal length of the first lens element 510 and the second lens element 520 combined is f12, the focal length of the third lens element 530, the fourth lens element 540 and the fifth lens element 550 combined is f345, and they satisfy the relation:
f12/f345=0.2430.

In the fifth embodiment of the present five-piece optical lens system, the focal length of the first lens element 510, the second lens element 520 and the third lens element 530 combined is f123, the focal length of the fifth lens element 550 is f5, and they satisfy the relation:
f123/f5=−3.6240.

In the fifth embodiment of the present five-piece optical lens system, the focal length of the five-piece optical lens system is f, the distance from the object-side surface 511 of the first lens element 510 to the image plane 570 along the optical axis 580 is TL, and they satisfy the relation:
f/TL=0.8093.

The detailed optical data of the fifth embodiment is shown in table 9, and the aspheric surface data is shown in table 10.

TABLE 9

(Embodiment 5)
f(focal length) = 4.0454 mm, Fno = 2.0, 2ω = 75°.

| Surface | | Curvature Radius | Thickness | Material | nd | vd |
|---|---|---|---|---|---|---|
| 0 | Object | Infinity | Infinity | | | |
| 1 | | Infinity | 0.2 | | | |
| 2 | STO | Infinity | −0.2 | | | |
| 3 | Lens 1 | 1.649996(ASP) | 0.7617667 | Plastic | 1.535 | 56 |
| 4 | | −15.21029(ASP) | 0.03 | | | |
| 5 | Lens 2 | 17.52352(ASP) | 0.24 | Plastic | 1.634 | 23.9 |
| 6 | | 2.490287(ASP) | 0.5719017 | | | |
| 7 | Lens 3 | 7.565779(ASP) | 0.4263813 | Plastic | 1.535 | 56 |
| 8 | | 5.065538(ASP) | 0.315624 | | | |
| 9 | Lens 4 | 25.65844(ASP) | 0.978174 | Plastic | 1.535 | 56 |
| 10 | | −0.9609542(ASP) | 0.1093178 | | | |
| 11 | Lens 5 | −17.09475(ASP) | 0.3877369 | Plastic | 1.535 | 56 |
| 12 | | 0.9221339(ASP) | 0.5228167 | | | |
| 13 | IR-filter | Infinity | 0.21 | Glass | 1.5168 | 64.16734 |
| 14 | | Infinity | 0.4448469 | | | |
| 15 | Image | Infinity | | | | |

TABLE 10

Aspheric Coefficients

| Surface | 3 | 4 | 5 | 6 | 7 |
|---|---|---|---|---|---|
| K = | −1.7333 | 187.9431 | 9.185283 | −1.57229 | −18.0161 |
| A = | 0.043549 | −0.1138 | −0.13729 | −0.03543 | −0.14331 |
| B = | 0.004117 | 0.56221 | 0.649346 | 0.274616 | 0.029315 |
| C = | −0.04726 | −1.21496 | −1.22219 | −0.36898 | 0.005026 |
| D = | 0.093159 | 1.24899 | 1.12183 | 0.269875 | −0.08331 |
| E = | −0.09734 | −0.65067 | −0.46475 | −0.02187 | 0.081432 |
| F = | 0.029189 | 0.138188 | 0.06434 | −0.03129 | −0.02932 |

| Surface | 8 | 9 | 10 | 11 | 12 |
|---|---|---|---|---|---|
| K = | −185.258 | 1.240549 | −4.59014 | −107.124 | −5.90156 |
| A = | −0.02944 | −0.07784 | −0.08949 | −0.14864 | −0.07929 |
| B = | −0.17055 | 0.046691 | 0.050791 | 0.064417 | 0.030937 |
| C = | 0.233545 | −0.045 | −0.01585 | −0.01158 | −0.00807 |
| D = | −0.21697 | 0.011988 | 0.002245 | 0.001037 | 0.001249 |
| E = | 0.103656 | −0.00131 | −1.39E−04 | −4.72E−05 | −9.85E−05 |
| F = | −0.02029 | 5.26E−05 | 3.15E−06 | 8.95E−07 | 2.91E−06 |

Figure 6A:
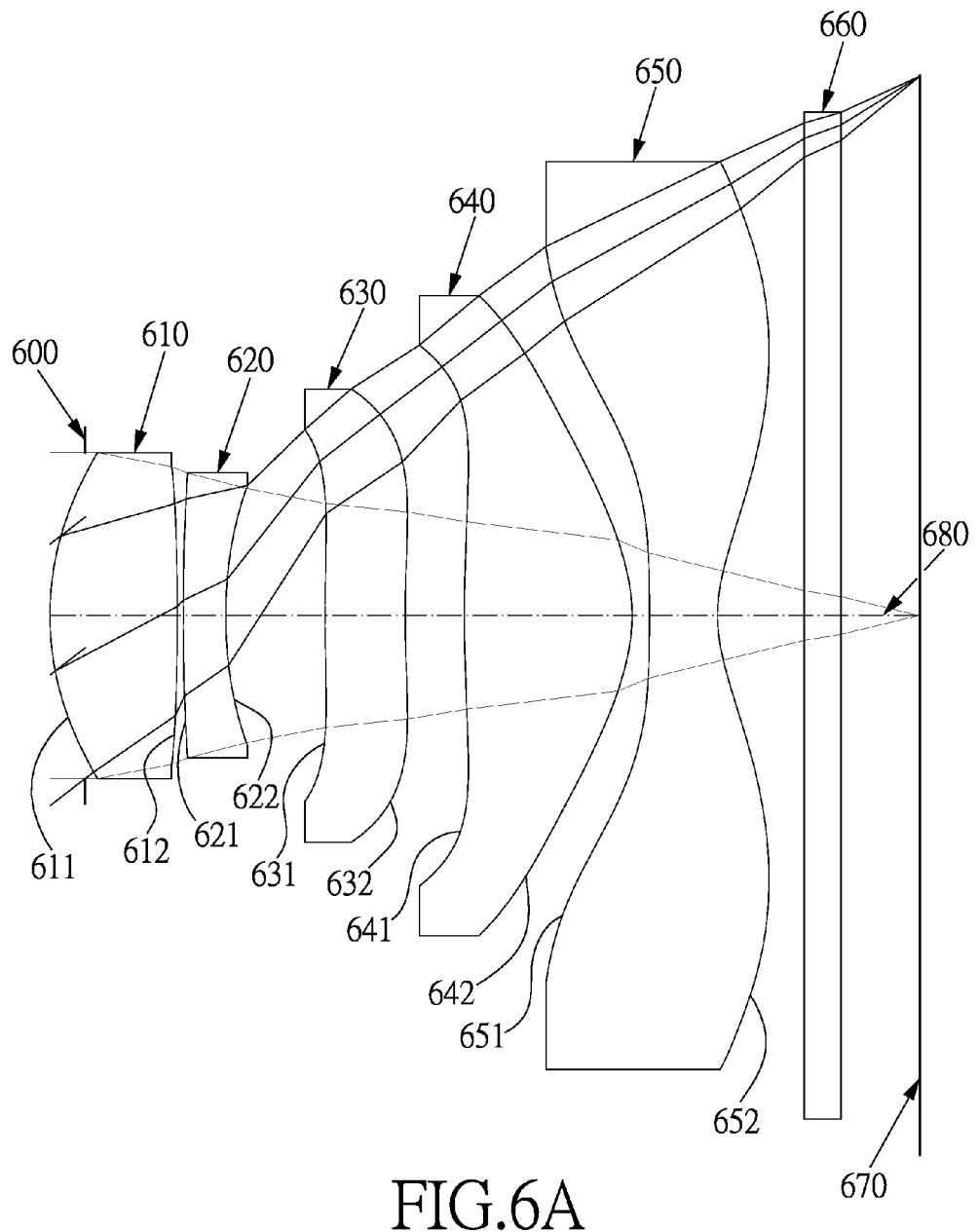
FIG. 6A shows a five-piece optical lens system in accordance with a sixth embodiment of the present invention.
Figure 6B:
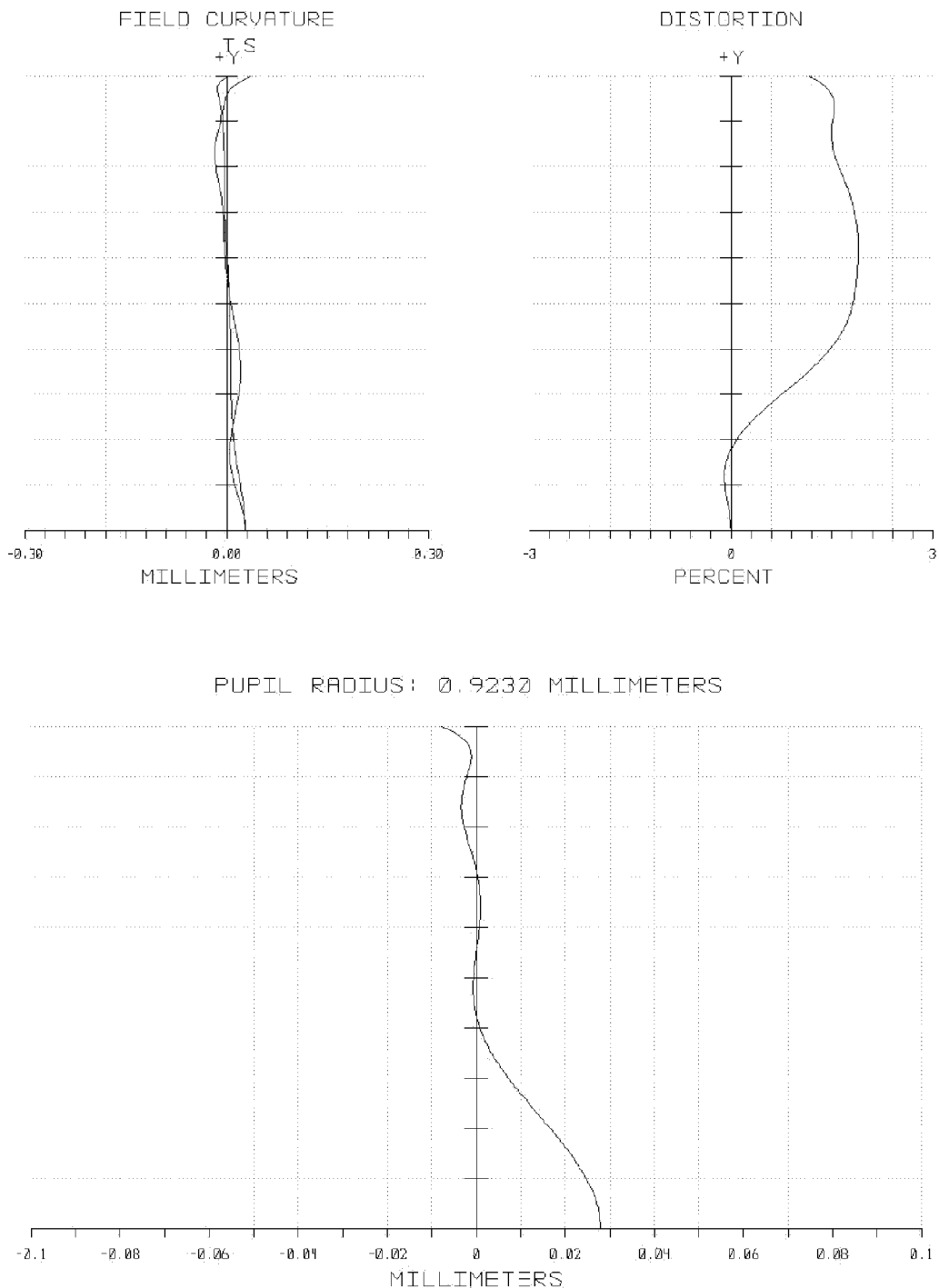
FIG. 6B shows the longitudinal spherical aberration curve, the astigmatic field curve and the distortion curve of the sixth embodiment of the present invention.

FIG. 6A shows a five-piece optical lens system in accordance with a sixth embodiment of the present invention, and FIG. 6B shows, in order from left to right, the longitudinal spherical aberration curves, the astigmatic field curves, and the distortion curve of the sixth embodiment of the present invention. A five-piece optical lens system in accordance with the sixth embodiment of the present invention comprises, in order from the object side to the image side: a stop 600, a first lens element 610, a second lens element 620, a third lens element 630, a fourth lens element 640, a fifth lens element 650, an IR cut filter 660 and an image plane 670.

The first lens element 610 with a positive refractive power has an object-side surface 611 being convex near an optical axis 680 and an image-side surface 612 being convex near the optical axis 680, the object-side surface 611 and the image-side surface 612 are aspheric, and the first lens element 610 is made of plastic material.

The second lens element 620 with a negative refractive power has an object-side surface 621 being convex near the optical axis 680 and an image-side surface 622 being concave near the optical axis 680, the object-side surface 621 and the image-side surface 622 are aspheric, and the second lens element 620 is made of plastic material.

The third lens element 630 with a negative refractive power has an object-side surface 631 being convex near the optical axis 680 and an image-side surface 632 being concave near the optical axis 680, the object-side surface 631 and the image-side surface 632 are aspheric, the third lens element 630 is made of plastic material, and at least one of the object-side and image-side surfaces 631, 632 of the third lens element 630 has an inflection point.

The fourth lens element 640 with a positive refractive power has an object-side surface 641 being convex near the optical axis 680 and an image-side surface 642 being convex near the optical axis 680, the object-side surface 641 and the image-side surface 642 are aspheric, the fourth lens element 640 is made of plastic material, and at least one of the object-side and image-side surfaces 641, 642 of the fourth lens element 640 has an inflection point.

The fifth lens element 650 with a negative refractive power has an object-side surface 651 being concave near the optical axis 680 and an image-side surface 652 being concave near the optical axis 680, the object-side surface 651 and the image-side surface 652 are aspheric, and the fifth lens element 650 is made of plastic material.

The IR cut filter 660 made of glass is located between the sixth lens element 650 and the image plane 670 and has no influence on the focal length of the five-piece optical lens system.

The equation for the aspheric surface profiles of the sixth embodiment has the same form as that of the first embodiment. Therefore, an explanation in this regard will not be provided again.

In the sixth embodiment of the present five-piece optical lens system, the focal length of the five-piece optical lens system is f, the f-number of the five-piece optical lens system is Fno, the field of view of the five-piece optical lens system is 2ω, and they satisfy the relations:

f=3.9527 mm;
Fno=2.0; and
2ω=75°.

In the sixth embodiment of the present five-piece optical lens system, the focal length of the first lens element 610 is f1, the focal length of the second lens element 620 is f2, and they satisfy the relation:

f1/f2=−0.6246.

In the sixth embodiment of the present five-piece optical lens system, the focal length of the second lens element 620 is f2, the focal length of the fourth lens element 640 is f4, and they satisfy the relation:

f2/f4=−2.6194.

In the sixth embodiment of the present five-piece optical lens system, the focal length of the fourth lens element 640 is f4, the focal length of the fifth lens element 650 is f5, and they satisfy the relation:

f4/f5=−1.1045.

In the sixth embodiment of the present five-piece optical lens system, the focal length of the first lens element 610 is f1, the focal length of the second lens element 620 and the third lens element 630 combined is f23, and they satisfy the relation:

f1/f23=−0.7304.

In the sixth embodiment of the present five-piece optical lens system, the focal length of the second lens element 620 and the third lens element 630 combined is f23, the focal length of the fourth lens element 640 is f4, and they satisfy the relation:

f23/f4=−2.2399.

In the sixth embodiment of the present five-piece optical lens system, the focal length of the first lens element 610 is f1, the focal length of the second lens element 620, the third lens element 630 and the fourth lens element 640 combined is f234, and they satisfy the relation:

f1/f234=1.5532.

In the sixth embodiment of the present five-piece optical lens system, the focal length of the second lens element 620, the third lens element 630 and the fourth lens element 640 combined is f234, the focal length of the fifth lens element 650 is f5, and they satisfy the relation:

f234/f5=−1.1634.

In the sixth embodiment of the present five-piece optical lens system, the focal length of the first lens element 610 and the second lens element 620 combined is f12, the focal length of the third lens element 630 and the fourth lens element 640 combined is f34, and they satisfy the relation:

f12/f34=3.0283.

In the sixth embodiment of the present five-piece optical lens system, the focal length of the second lens element 620 is f2, the focal length of the third lens element 630 and the fourth lens element 640 combined is f34, and they satisfy the relation:

f2/f34=−2.5088.

In the sixth embodiment of the present five-piece optical lens system, the focal length of the third lens element 630 and the fourth lens element 640 combined is f34, the focal length of the fifth lens element 650 is f5, and they satisfy the relation:

f34/f5=−1.1532.

In the sixth embodiment of the present five-piece optical lens system, the focal length of the first lens element 610 and the second lens element 620 combined is f12, the focal length of the third lens element 630, the fourth lens element 640 and the fifth lens element 650 combined is f345, and they satisfy the relation:

f12/f345=0.2907.

In the sixth embodiment of the present five-piece optical lens system, the focal length of the first lens element 610, the second lens element 620 and the third lens element 630 combined is f123, the focal length of the fifth lens element 650 is f5, and they satisfy the relation:

f123/f5=−3.7748.

In the sixth embodiment of the present five-piece optical lens system, the focal length of the five-piece optical lens system is f, the distance from the object-side surface 611 of the first lens element 610 to the image plane 670 along the optical axis 680 is TL, and they satisfy the relation:

f/TL=0.8093.

The detailed optical data of the sixth embodiment is shown in table 11, and the aspheric surface data is shown in table 12.

TABLE 11

(Embodiment 6)
f(focal length) = 3.9527 mm, Fno = 2.0, 2ω = 75°.

| Surface | | Curvature Radius | Thickness | Material | nd | vd |
|---|---|---|---|---|---|---|
| 0 | Object | Infinity | Infinity | | | |
| 1 | | Infinity | 0.2 | | | |
| 2 | STO | Infinity | −0.2 | | | |
| 3 | Lens 1 | 1.659518(ASP) | 0.7215319 | Plastic | 1.535 | 56 |
| 4 | | −14.90763(ASP) | 0.03259182 | | | |
| 5 | Lens 2 | 12.8925(ASP) | 0.24 | Plastic | 1.634 | 23.9 |
| 6 | | 2.345692(ASP) | 0.5614874 | | | |
| 7 | Lens 3 | 8.184045(ASP) | 0.453995 | Plastic | 1.535 | 56 |
| 8 | | 5.627167(ASP) | 0.3349062 | | | |

TABLE 11-continued (Embodiment 6)
f(focal length) = 3.9527 mm, Fno = 2.0, 2ω = 75°.

| Surface | | Curvature Radius | Thickness | Material | nd | vd |
|---|---|---|---|---|---|---|
| 9 | Lens 4 | 8.760368(ASP) | 0.9484581 | Plastic | 1.535 | 56 |
| 10 | | −0.9972507(ASP) | 0.09707883 | | | |
| 11 | Lens 5 | −18.9084(ASP) | 0.385 | Plastic | 1.535 | 56 |
| 12 | | 0.8843843(ASP) | 0.4891241 | | | |
| 13 | IR-filter | Infinity | 0.21 | Glass | 1.5168 | 64.16734 |
| 14 | | Infinity | 0.4448469 | | | |
| 15 | Image | Infinity | | | | |

TABLE 12

Aspheric Coefficients

| Surface | 3 | 4 | 5 | 6 | 7 |
|---|---|---|---|---|---|
| K = | −1.70985 | −1.70985 | 9.185283 | 9.185283 | −18.0161 |
| A = | 0.046053 | 0.046053 | −0.0956 | −0.0956 | −0.13024 |
| B = | −0.00612 | −0.00612 | 0.459691 | 0.459691 | 0.020013 |
| C = | −0.01294 | −0.01294 | −0.87528 | −0.87528 | −0.01201 |
| D = | 0.04746 | 0.04746 | 0.775002 | 0.775002 | −0.02252 |
| E = | −0.06638 | −0.06638 | −0.30224 | −0.30224 | 0.010125 |
| F = | 0.021066 | 0.021066 | 0.040841 | 0.040841 | −0.00373 |

| Surface | 8 | 9 | 10 | 11 | 12 |
|---|---|---|---|---|---|
| K = | −18.0161 | 1.240549 | 1.240549 | −107.124 | −107.124 |
| A = | −0.13024 | −0.04503 | −0.04503 | −0.2033 | −0.2033 |
| B = | 0.020013 | 0.033406 | 0.033406 | 0.090957 | 0.090957 |
| C = | −0.01201 | −0.03602 | −0.03602 | −0.01761 | −0.01761 |
| D = | −0.02252 | 0.009337 | 0.009337 | 0.001735 | 0.001735 |
| E = | 0.010125 | −9.79E−04 | −9.79E−04 | −8.57E−05 | −8.57E−05 |
| F = | −0.00373 | 3.73E−05 | 3.73E−05 | 1.70E−06 | 1.70E−06 |

Figure 7A:
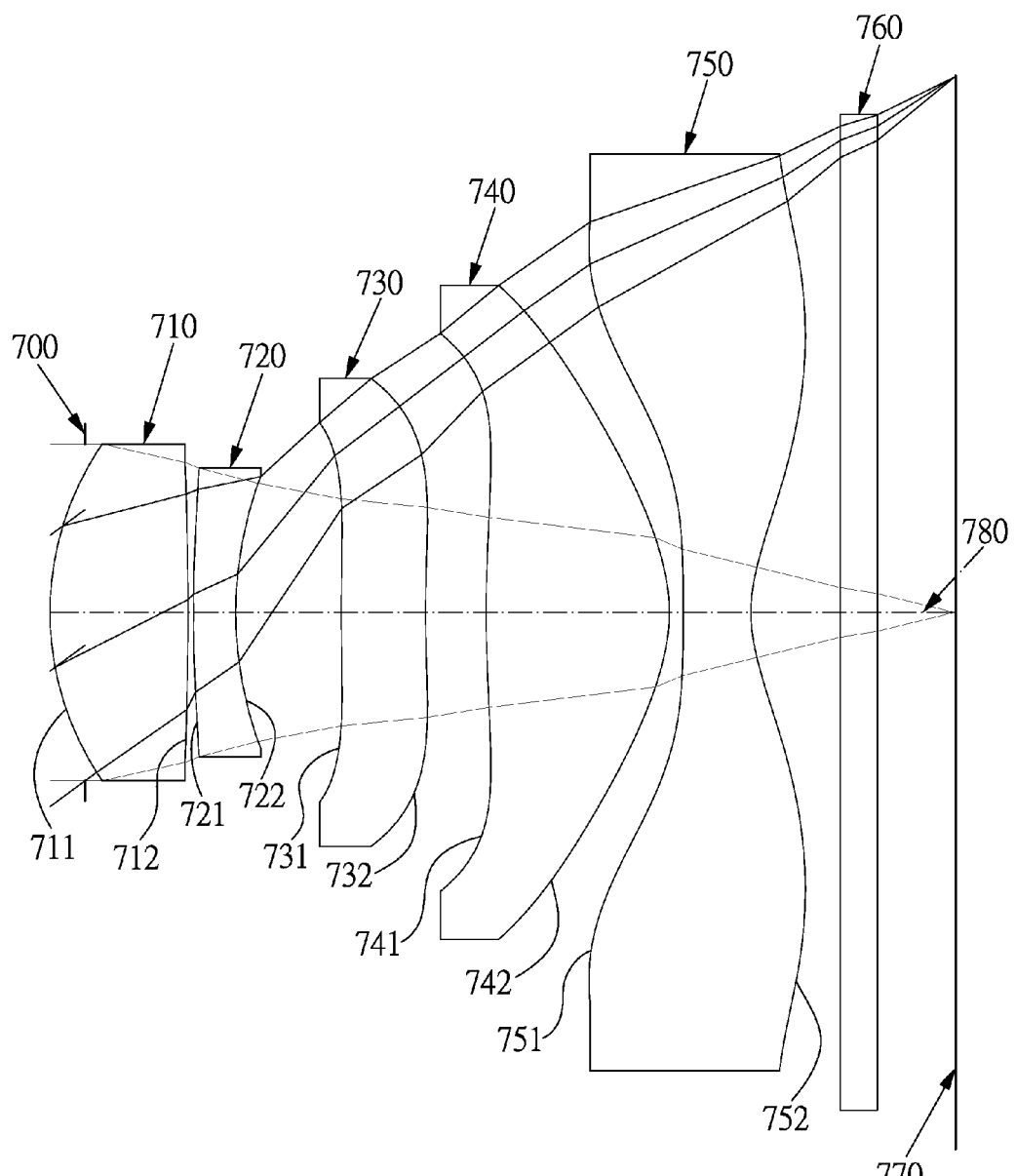
FIG. 7A shows a five-piece optical lens system in accordance with a seventh embodiment of the present invention.
Figure 7B:
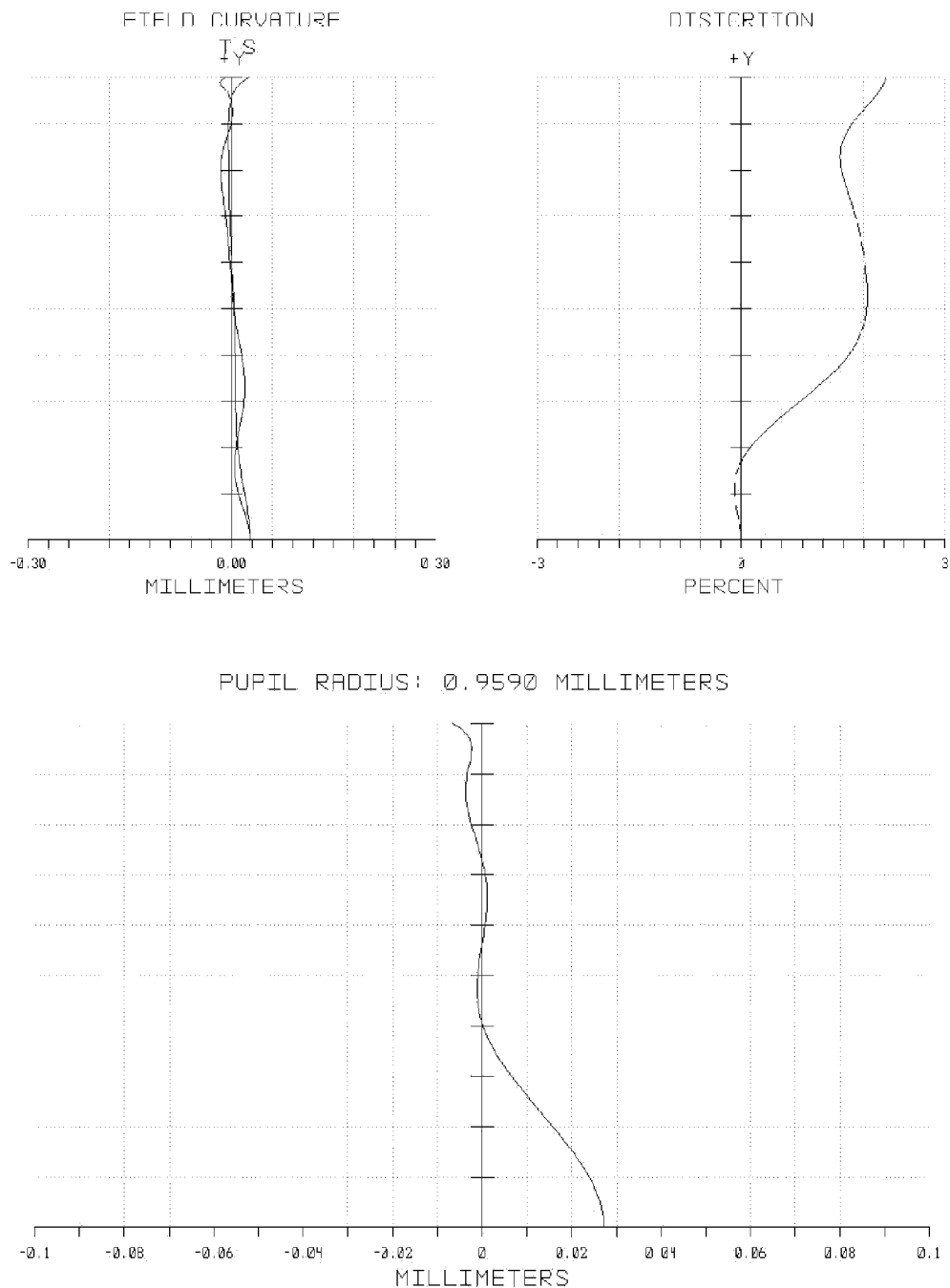
FIG. 7B shows the longitudinal spherical aberration curve, the astigmatic field curve and the distortion curve of the seventh embodiment of the present invention.

FIG. 7A shows a five-piece optical lens system in accordance with a seventh embodiment of the present invention, and FIG. 7B shows, in order from left to right, the longitudinal spherical aberration curves, the astigmatic field curves, and the distortion curve of the seventh embodiment of the present invention. A five-piece optical lens system in accordance with the seventh embodiment of the present invention comprises, in order from the object side to the image side: a stop 700, a first lens element 710, a second lens element 720, a third lens element 730, a fourth lens element 740, a fifth lens element 750, an IR cut filter 760 and an image plane 770.

The first lens element 710 with a positive refractive power has an object-side surface 711 being convex near an optical axis 780 and an image-side surface 712 being convex near the optical axis 780, the object-side surface 711 and the image-side surface 712 are aspheric, and the first lens element 710 is made of plastic material.

The second lens element 720 with a negative refractive power has an object-side surface 721 being convex near the optical axis 780 and an image-side surface 722 being concave near the optical axis 780, the object-side surface 721 and the image-side surface 722 are aspheric, and the second lens element 720 is made of plastic material.

The third lens element 730 with a negative refractive power has an object-side surface 731 being convex near the optical axis 780 and an image-side surface 732 being concave near the optical axis 780, the object-side surface 731 and the image-side surface 732 are aspheric, the third lens element 730 is made of plastic material, and at least one of the object-side and image-side surfaces 731, 732 of the third lens element 730 has an inflection point.

The fourth lens element 740 with a positive refractive power has an object-side surface 741 being convex near the optical axis 780 and an image-side surface 742 being convex near the optical axis 780, the object-side surface 741 and the image-side surface 742 are aspheric, the fourth lens element 740 is made of plastic material, and at least one of the object-side and image-side surfaces 741, 742 of the fourth lens element 740 has an inflection point.

The fifth lens element 750 with a negative refractive power has an object-side surface 751 being concave near the optical axis 780 and an image-side surface 752 being concave near the optical axis 780, the object-side surface 751 and the image-side surface 752 are aspheric, and the fifth lens element 750 is made of plastic material.

The IR cut filter 760 made of glass is located between the seventh lens element 750 and the image plane 770 and has no influence on the focal length of the five-piece optical lens system.

The equation for the aspheric surface profiles of the seventh embodiment has the same form as that of the first embodiment. Therefore, an explanation in this regard will not be provided again.

In the seventh embodiment of the present five-piece optical lens system, the focal length of the five-piece optical lens system is f, the f-number of the five-piece optical lens system is Fno, the field of view of the five-piece optical lens system is 2ω, and they satisfy the relations:

f=4.1072 mm;
Fno=2.0; and
2ω=73°.

In the seventh embodiment of the present five-piece optical lens system, the focal length of the first lens element 710 is f1, the focal length of the second lens element 720 is f2, and they satisfy the relation:

f1/f2=−0.6530.

In the seventh embodiment of the present five-piece optical lens system, the focal length of the second lens element 720 is f2, the focal length of the fourth lens element 740 is f4, and they satisfy the relation:

f2/f4=−2.5776.

In the seventh embodiment of the present five-piece optical lens system, the focal length of the fourth lens element 740 is f4, the focal length of the fifth lens element 750 is f5, and they satisfy the relation:

f4/f5=−1.0891.

In the seventh embodiment of the present five-piece optical lens system, the focal length of the first lens element 710 is f1, the focal length of the second lens element 720 and the third lens element 730 combined is f23, and they satisfy the relation:

f1/f23=−0.7577.

In the seventh embodiment of the present five-piece optical lens system, the focal length of the second lens element 720 and the third lens element 730 combined is f23, the focal length of the fourth lens element 740 is f4, and they satisfy the relation:

f23/f4=−2.2215.

In the seventh embodiment of the present five-piece optical lens system, the focal length of the first lens element 710 is f1, the focal length of the second lens element 720, the third lens element 730 and the fourth lens element 740 combined is f234, and they satisfy the relation:

f1/f234=1.6445.

In the seventh embodiment of the present five-piece optical lens system, the focal length of the second lens element 720, the third lens element 730 and the fourth lens element 740 combined is f234, the focal length of the fifth lens element 750 is f5, and they satisfy the relation:

f234/f5=−1.1147.

In the seventh embodiment of the present five-piece optical lens system, the focal length of the first lens element 710 and the second lens element 720 combined is f12, the focal length of the third lens element 730 and the fourth lens element 740 combined is f34, and they satisfy the relation:

f12/f34=3.2111.

In the seventh embodiment of the present five-piece optical lens system, the focal length of the second lens element 720 is f2, the focal length of the third lens element 730 and the fourth lens element 740 combined is f34, and they satisfy the relation:

f2/f34=−2.4840.

In the seventh embodiment of the present five-piece optical lens system, the focal length of the third lens element 730 and the fourth lens element 740 combined is f34, the focal length of the fifth lens element 750 is f5, and they satisfy the relation:

f34/f5=−1.1301.

In the seventh embodiment of the present five-piece optical lens system, the focal length of the first lens element 710 and the second lens element 720 combined is f12, the focal length of the third lens element 730, the fourth lens element 740 and the fifth lens element 750 combined is f345, and they satisfy the relation:

f12/f345=0.3635.

In the seventh embodiment of the present five-piece optical lens system, the focal length of the first lens element 710, the second lens element 720 and the third lens element 730 combined is f123, the focal length of the fifth lens element 750 is f5, and they satisfy the relation:

f123/f5=−3.9408.

In the seventh embodiment of the present five-piece optical lens system, the focal length of the five-piece optical lens system is f, the distance from the object-side surface 711 of the first lens element 710 to the image plane 770 along the optical axis 780 is TL, and they satisfy the relation:

f/TL=0.7972.

The detailed optical data of the seventh embodiment is shown in table 13, and the aspheric surface data is shown in table 14.

TABLE 13

(Embodiment 7)
f(focal length) = 4.1072 mm, Fno = 2.0, 2ω = 73°.

| Surface | | Curvature Radius | Thickness | Material | nd | vd |
|---|---|---|---|---|---|---|
| 0 | Object | Infinity | Infinity | | | |
| 1 | | Infinity | 0.1997901 | | | |
| 2 | STO | Infinity | −0.1997901 | | | |
| 3 | Lens 1 | 1.698975(ASP) | 0.7859623 | Plastic | 1.535 | 56 |
| 4 | | −16.29673(ASP) | 0.03018834 | | | |
| 5 | Lens 2 | 7.571289(ASP) | 0.24 | Plastic | 1.634 | 23.9 |
| 6 | | 2.045652(ASP) | 0.6010254 | | | |
| 7 | Lens 3 | 10.72724(ASP) | 0.4802401 | Plastic | 1.535 | 56 |
| 8 | | 6.846548(ASP) | 0.3443657 | | | |
| 9 | Lens 4 | 7.302751(ASP) | 1.041967 | Plastic | 1.535 | 56 |
| 10 | | −1.010388(ASP) | 0.07905341 | | | |
| 11 | Lens 5 | −22.99679(ASP) | 0.385 | Plastic | 1.535 | 56 |
| 12 | | 0.8903272(ASP) | 0.5093522 | | | |
| 13 | IR-filter | Infinity | 0.21 | Glass | 1.5168 | 64.16734 |
| 14 | | Infinity | 0.4448469 | | | |
| 15 | Image | Infinity | | | | |

TABLE 14

Aspheric Coefficients

| Surface | 3 | 4 | 5 | 6 | 7 |
|---|---|---|---|---|---|
| K = | −1.19442 | 187.9431 | 9.185283 | −3.63388 | −18.0161 |
| A = | 0.034727 | −0.02403 | −0.1135 | −0.0468 | −0.10666 |
| B = | −0.0011 | 0.331903 | 0.43214 | 0.25541 | −0.0295 |
| C = | 0.007261 | −0.83011 | −0.90779 | −0.43538 | 0.114328 |
| D = | 0.002326 | 0.985208 | 1.00883 | 0.506551 | −0.19558 |
| E = | −0.01008 | −0.62223 | −0.61459 | −0.32992 | 0.138824 |
| F = | 0.002728 | 0.163385 | 0.162156 | 0.099722 | −0.04107 |

| Surface | 8 | 9 | 10 | 11 | 12 |
|---|---|---|---|---|---|
| K = | −185.258 | 1.24055 | −5.23029 | −107.124 | −5.73021 |
| A = | −0.07076 | −0.05114 | −0.07428 | −0.19571 | −0.09183 |
| B = | −0.04474 | 0.026647 | 0.047127 | 0.087507 | 0.036995 |
| C = | 0.040989 | −0.02614 | −0.01533 | −0.01717 | −0.00945 |
| D = | −0.03748 | 0.006637 | 0.00216 | 0.001769 | 0.001389 |
| E = | 0.016084 | −6.85E−04 | −1.32E−04 | −9.14E−05 | −1.05E−04 |
| F = | −0.00281 | 2.58E−05 | 2.92E−06 | 1.87E−06 | 3.18E−06 |

Figure 8A:
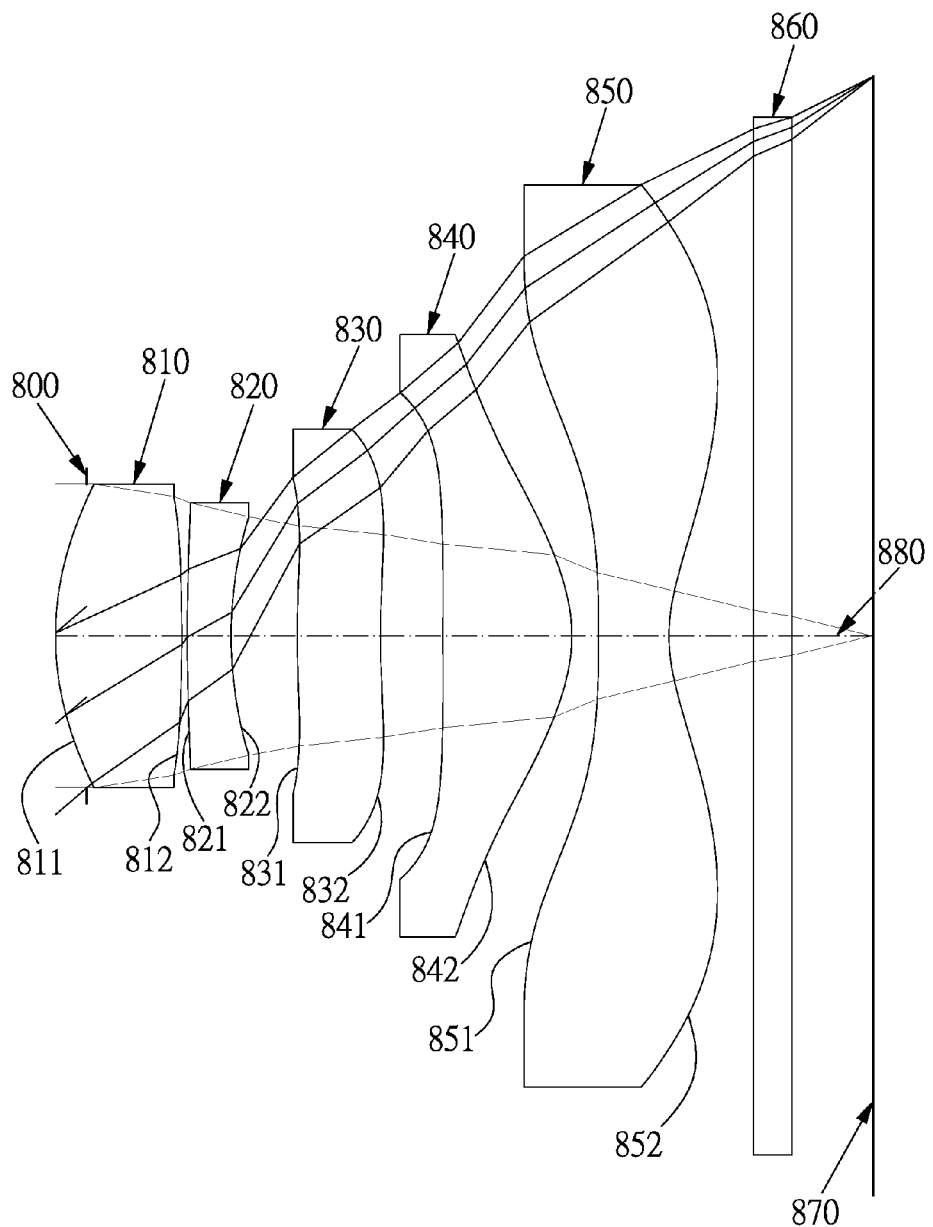
FIG. 8A shows a five-piece optical lens system in accordance with an eighth embodiment of the present invention.
Figure 8B:
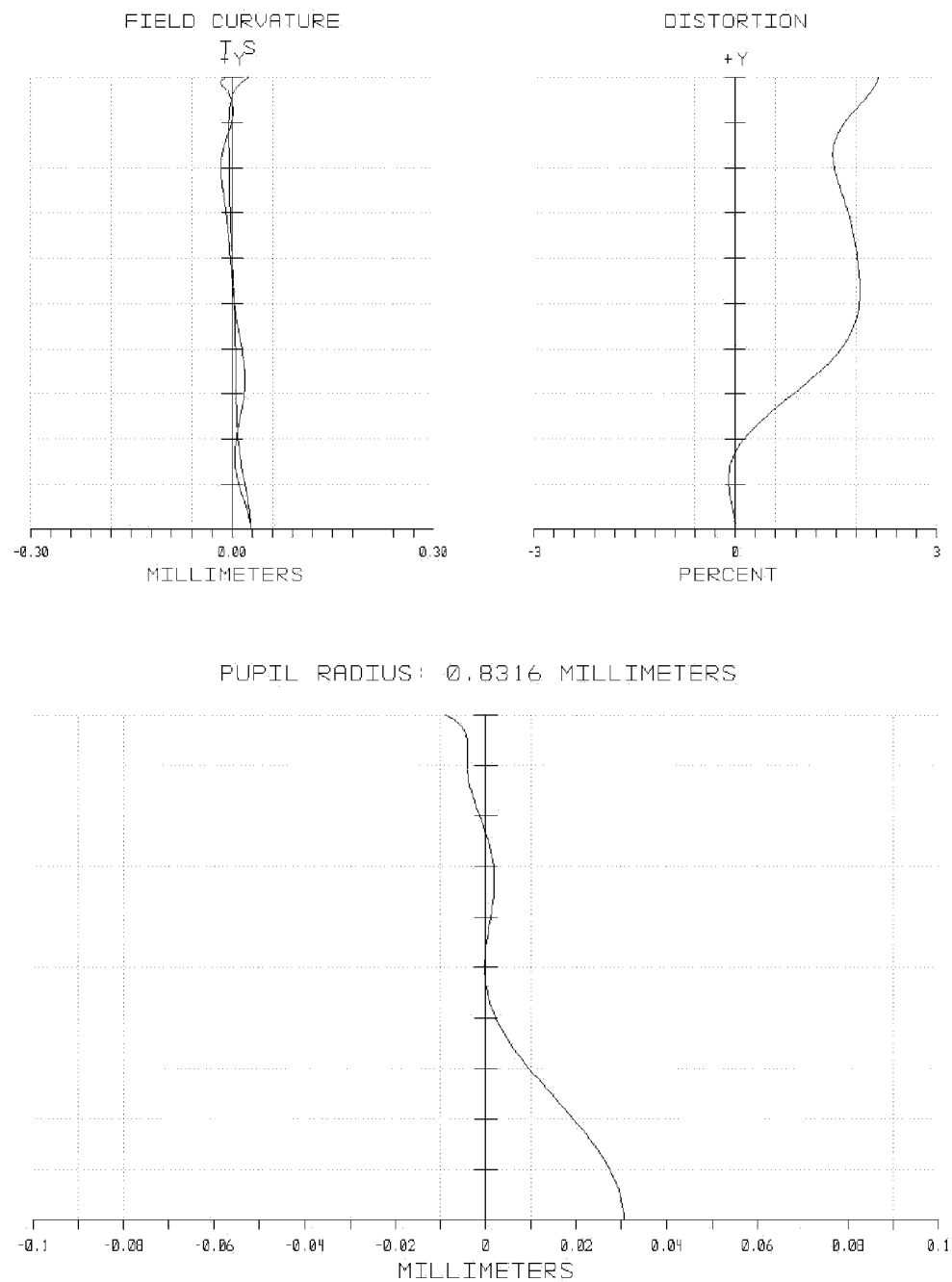
FIG. 8B shows the longitudinal spherical aberration curve, the astigmatic field curve and the distortion curve of the eighth embodiment of the present invention.

FIG. 8A shows a five-piece optical lens system in accordance with a eighth embodiment of the present invention, and FIG. 8B shows, in order from left to right, the longitudinal spherical aberration curves, the astigmatic field curves, and the distortion curve of the eighth embodiment of the present invention. A five-piece optical lens system in accordance with the eighth embodiment of the present invention comprises, in order from the object side to the image side: a stop 800, a first lens element 810, a second lens element 820, a third lens element 830, a fourth lens element 840, a fifth lens element 850, an IR cut filter 860 and an image plane 870.

The first lens element 810 with a positive refractive power has an object-side surface 811 being convex near an optical axis 880 and an image-side surface 812 being convex near the optical axis 880, the object-side surface 811 and the image-side surface 812 are aspheric, and the first lens element 810 is made of plastic material.

The second lens element 820 with a negative refractive power has an object-side surface 821 being convex near the optical axis 880 and an image-side surface 822 being concave near the optical axis 880, the object-side surface 821 and the image-side surface 822 are aspheric, and the second lens element 820 is made of plastic material.

The third lens element 830 with a negative refractive power has an object-side surface 831 being convex near the optical axis 880 and an image-side surface 832 being concave near the optical axis 880, the object-side surface 831 and the image-side surface 832 are aspheric, the third lens element 830 is made of plastic material, and at least one of the object-side and image-side surfaces 831, 832 of the third lens element 830 has an inflection point.

The fourth lens element 840 with a positive refractive power has an object-side surface 841 being convex near the optical axis 880 and an image-side surface 842 being convex near the optical axis 880, the object-side surface 841 and the image-side surface 842 are aspheric, the fourth lens element 840 is made of plastic material, and at least one of the object-side and image-side surfaces 841, 842 of the fourth lens element 840 has an inflection point.

The fifth lens element 850 with a negative refractive power has an object-side surface 851 being concave near the optical axis 880 and an image-side surface 852 being concave near the optical axis 880, the object-side surface 851 and the image-side surface 852 are aspheric, and the fifth lens element 850 is made of plastic material.

The IR cut filter 860 made of glass is located between the seventh lens element 850 and the image plane 870 and has no influence on the focal length of the five-piece optical lens system.

The equation for the aspheric surface profiles of the eighth embodiment has the same form as that of the first embodiment. Therefore, an explanation in this regard will not be provided again.

In the eighth embodiment of the present five-piece optical lens system, the focal length of the five-piece optical lens system is f, the f-number of the five-piece optical lens system is Fno, the field of view of the five-piece optical lens system is 2ω, and they satisfy the relations:

f=3.5615 mm;
Fno=2.0; and
2ω=81°.

In the eighth embodiment of the present five-piece optical lens system, the focal length of the first lens element 810 is f1, the focal length of the second lens element 820 is f2, and they satisfy the relation:

f1/f2=−0.6100.

In the eighth embodiment of the present five-piece optical lens system, the focal length of the second lens element 820 is f2, the focal length of the fourth lens element 840 is f4, and they satisfy the relation:

f2/f4=−2.7232.

In the eighth embodiment of the present five-piece optical lens system, the focal length of the fourth lens element 840 is f4, the focal length of the fifth lens element 850 is f5, and they satisfy the relation:

f4/f5=−1.0728.

In the eighth embodiment of the present five-piece optical lens system, the focal length of the first lens element 810 is f1, the focal length of the second lens element 820 and the third lens element 830 combined is f23, and they satisfy the relation:

f1/f23=−0.6758.

In the eighth embodiment of the present five-piece optical lens system, the focal length of the second lens element 820 and the third lens element 830 combined is f23, the focal length of the fourth lens element 840 is f4, and they satisfy the relation:

f23/f4=−2.4582.

In the eighth embodiment of the present five-piece optical lens system, the focal length of the first lens element 810 is f1, the focal length of the second lens element 820, the third lens element 830 and the fourth lens element 840 combined is f234, and they satisfy the relation:

f1/f234=1.4815.

In the eighth embodiment of the present five-piece optical lens system, the focal length of the second lens element 820, the third lens element 830 and the fourth lens element 840 combined is f234, the focal length of the fifth lens element 850 is f5, and they satisfy the relation:

f234/f5=−1.2030.

In the eighth embodiment of the present five-piece optical lens system, the focal length of the first lens element 810 and the second lens element 820 combined is f12, the focal length of the third lens element 830 and the fourth lens element 840 combined is f34, and they satisfy the relation:

f12/f34=3.0152.

In the eighth embodiment of the present five-piece optical lens system, the focal length of the second lens element 820 is f2, the focal length of the third lens element 830 and the fourth lens element 840 combined is f34, and they satisfy the relation:

f2/f34=−2.6125.

In the eighth embodiment of the present five-piece optical lens system, the focal length of the third lens element 830 and the fourth lens element 840 combined is f34, the focal length of the fifth lens element 850 is f5, and they satisfy the relation:

f34/f5=−1.1183.

In the eighth embodiment of the present five-piece optical lens system, the focal length of the first lens element 810 and the second lens element 820 combined is f12, the focal length of the third lens element 830, the fourth lens element 840 and the fifth lens element 850 combined is f345, and they satisfy the relation:

f12/f345=0.4311.

In the eighth embodiment of the present five-piece optical lens system, the focal length of the first lens element 810, the second lens element 820 and the third lens element 830 combined is f123, the focal length of the fifth lens element 850 is f5, and they satisfy the relation:

f123/f5=−3.4597.

In the eighth embodiment of the present five-piece optical lens system, the focal length of the five-piece optical lens system is f, the distance from the object-side surface 811 of the first lens element 810 to the image plane 870 along the optical axis 880 is TL, and they satisfy the relation:

f/TL=0.7960.

The detailed optical data of the eighth embodiment is shown in table 15, and the aspheric surface data is shown in table 16.

TABLE 15

(Embodiment 8)
f(focal length) = 3.5615 mm, Fno = 2.0, 2ω = 81°.

| Surface | | Curvature Radius | Thickness | Material | nd | vd |
|---|---|---|---|---|---|---|
| 0 | Object | Infinity | Infinity | | | |
| 1 | | Infinity | 0.1720429 | | | |
| 2 | STO | Infinity | −0.1720429 | | | |
| 3 | Lens 1 | 1.648606(ASP) | 0.6906806 | Plastic | 1.535 | 56 |
| 4 | | −13.65345(ASP) | 0.0300563 | | | |
| 5 | Lens 2 | 9.248879(ASP) | 0.24 | Plastic | 1.634 | 23.9 |
| 6 | | 2.196668(ASP) | 0.3629824 | | | |
| 7 | Lens 3 | 5.872826(ASP) | 0.4553499 | Plastic | 1.535 | 56 |
| 8 | | 4.888766(ASP) | 0.341147 | | | |
| 9 | Lens 4 | 68.86957(ASP) | 0.7047294 | Plastic | 1.535 | 56 |
| 10 | | −0.9083183(ASP) | 0.1464949 | | | |
| 11 | Lens 5 | −11.47937(ASP) | 0.385 | Plastic | 1.535 | 56 |
| 12 | | 0.9352806(ASP) | 0.4627127 | | | |
| 13 | IR-filter | Infinity | 0.21 | Glass | 1.5168 | 64.16734 |
| 14 | | Infinity | 0.4448469 | | | |
| 15 | Image | Infinity | | | | |

TABLE 16

Aspheric Coefficients

| Surface | 3 | 4 | 5 | 6 | 7 |
|---|---|---|---|---|---|
| K = | −2.16095 | 187.9431 | 9.185283 | −2.33945 | −18.0161 |
| A = | 0.051206 | −0.17581 | −0.22114 | −0.09051 | −0.17105 |
| B = | −0.01059 | 1.017265 | 1.154655 | 0.449533 | 0.066034 |
| C = | −0.05242 | −2.98227 | −2.97142 | −0.89541 | −0.01194 |
| D = | 0.133167 | 4.17548 | 3.78851 | 0.876331 | −0.08422 |
| E = | −0.20343 | −2.92249 | −2.31154 | −0.35179 | 0.084688 |
| F = | 0.081154 | 0.819993 | 0.543454 | 0.036353 | −0.04354 |

| Surface | 8 | 9 | 10 | 11 | 12 |
|---|---|---|---|---|---|
| K = | −185.258 | 1.240549 | −4.61955 | −107.124 | −6.58683 |
| A = | −0.03435 | −0.07608 | −0.12892 | −0.15949 | −0.08838 |
| B = | −0.1572 | 0.091669 | 0.136415 | 0.07721 | 0.032537 |
| C = | 0.177016 | −0.08768 | −0.05347 | −0.01558 | −0.0077 |
| D = | −0.16456 | 0.024601 | 0.009681 | 0.001533 | 0.000821 |
| E = | 0.080807 | −0.00288 | −0.00078 | −6.87E−05 | −1.45E−05 |
| F = | −0.01714 | 1.24E−04 | 2.34E−05 | 1.04E−06 | −2.15E−06 |

Figure 9A:
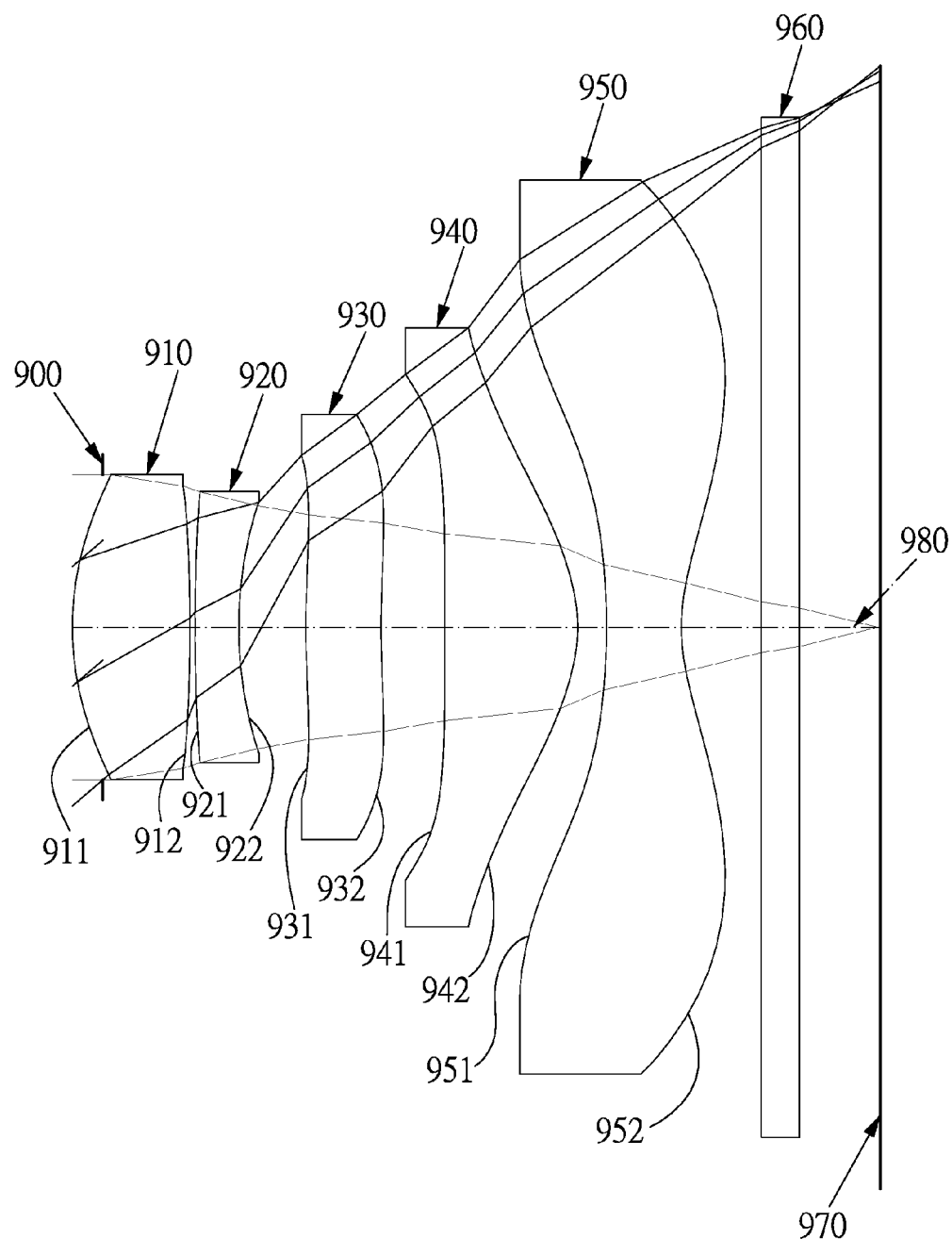
FIG. 9A shows a five-piece optical lens system in accordance with a ninth embodiment of the present invention.
Figure 9B:
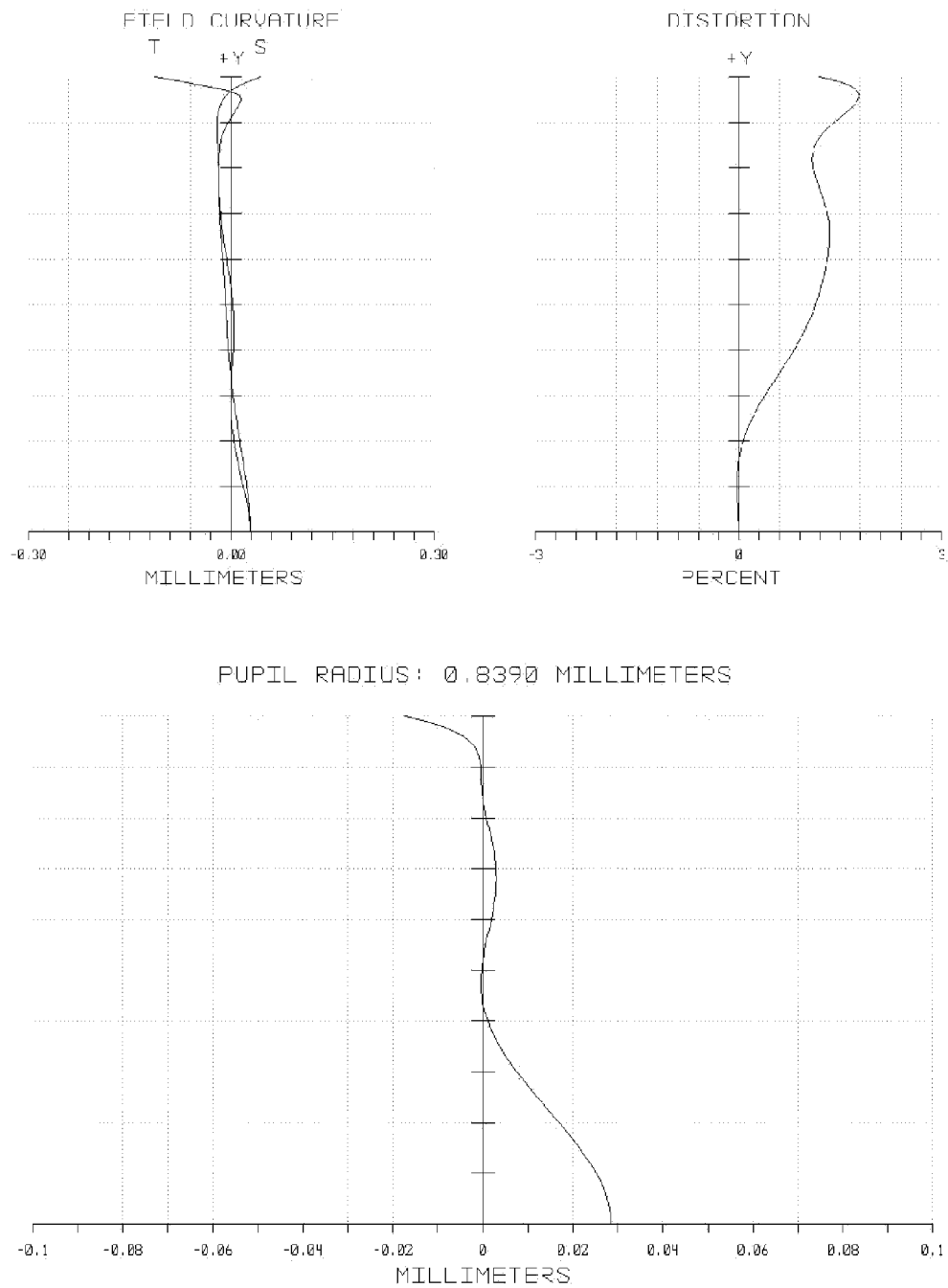
FIG. 9B shows the longitudinal spherical aberration curve, the astigmatic field curve and the distortion curve of the ninth embodiment of the present invention.

FIG. 9A shows a five-piece optical lens system in accordance with a ninth embodiment of the present invention, and FIG. 9B shows, in order from left to right, the longitudinal spherical aberration curves, the astigmatic field curves, and the distortion curve of the ninth embodiment of the present invention. A five-piece optical lens system in accordance with the ninth embodiment of the present invention comprises, in order from the object side to the image side: a stop 900, a first lens element 910, a second lens element 920, a third lens element 930, a fourth lens element 940, a fifth lens element 950, an IR cut filter 960 and an image plane 970.

The first lens element 910 with a positive refractive power has an object-side surface 911 being convex near an optical axis 980 and an image-side surface 912 being convex near the optical axis 980, the object-side surface 911 and the image-side surface 912 are aspheric, and the first lens element 910 is made of plastic material.

The second lens element 920 with a negative refractive power has an object-side surface 921 being convex near the optical axis 980 and an image-side surface 922 being concave near the optical axis 980, the object-side surface 921 and the image-side surface 922 are aspheric, and the second lens element 920 is made of plastic material.

The third lens element 930 with a positive refractive power has an object-side surface 931 being convex near the optical axis 980 and an image-side surface 932 being concave near the optical axis 980, the object-side surface 931 and the image-side surface 932 are aspheric, the third lens element 930 is made of plastic material, and at least one of the object-side and image-side surfaces 931, 932 of the third lens element 930 has an inflection point.

The fourth lens element 940 with a positive refractive power has an object-side surface 941 being convex near the optical axis 980 and an image-side surface 942 being convex near the optical axis 980, the object-side surface 941 and the image-side surface 942 are aspheric, the fourth lens element 940 is made of plastic material, and at least one of the object-side and image-side surfaces 941, 942 of the fourth lens element 940 has an inflection point.

The fifth lens element 950 with a negative refractive power has an object-side surface 951 being concave near the optical axis 980 and an image-side surface 952 being concave near the optical axis 980, the object-side surface 951 and the image-side surface 952 are aspheric, and the fifth lens element 950 is made of plastic material.

The IR cut filter 960 made of glass is located between the seventh lens element 950 and the image plane 970 and has no influence on the focal length of the five-piece optical lens system.

The equation for the aspheric surface profiles of the ninth embodiment has the same form as that of the first embodiment. Therefore, an explanation in this regard will not be provided again.

In the ninth embodiment of the present five-piece optical lens system, the focal length of the five-piece optical lens system is f, the f-number of the five-piece optical lens system is Fno, the field of view of the five-piece optical lens system is 2ω, and they satisfy the relations:
f=3.5658 mm;
Fno=2.0; and
2ω=81°.

In the ninth embodiment of the present five-piece optical lens system, the focal length of the first lens element 910 is f1, the focal length of the second lens element 920 is f2, and they satisfy the relation:
f1/f2=−0.6064.

In the ninth embodiment of the present five-piece optical lens system, the focal length of the second lens element 920 is f2, the focal length of the fourth lens element 940 is f4, and they satisfy the relation:
f2/f4=−2.7295.

In the ninth embodiment of the present five-piece optical lens system, the focal length of the fourth lens element 940 is f4, the focal length of the fifth lens element 950 is f5, and they satisfy the relation:
f4/f5=−1.1155.

In the ninth embodiment of the present five-piece optical lens system, the focal length of the first lens element 910 is f1, the focal length of the second lens element 920 and the third lens element 930 combined is f23, and they satisfy the relation:
f1/f23=−0.6192.

In the ninth embodiment of the present five-piece optical lens system, the focal length of the second lens element 920 and the third lens element 930 combined is f23, the focal length of the fourth lens element 940 is f4, and they satisfy the relation:
f23/f4=−2.6728.

In the ninth embodiment of the present five-piece optical lens system, the focal length of the first lens element 910 is f1, the focal length of the second lens element 920, the third lens element 930 and the fourth lens element 940 combined is f234, and they satisfy the relation:
f1/f234=1.5013.

In the ninth embodiment of the present five-piece optical lens system, the focal length of the second lens element 920, the third lens element 930 and the fourth lens element 940 combined is f234, the focal length of the fifth lens element 950 is f5, and they satisfy the relation:
f234/f5=−1.2298.

In the ninth embodiment of the present five-piece optical lens system, the focal length of the first lens element 910 and the second lens element 920 combined is f12, the focal length of the third lens element 930 and the fourth lens element 940 combined is f34, and they satisfy the relation:
f12/f34=3.0635.

In the ninth embodiment of the present five-piece optical lens system, the focal length of the second lens element 920 is f2, the focal length of the third lens element 930 and the fourth lens element 940 combined is f34, and they satisfy the relation:
f2/f34=−2.6577.

In the ninth embodiment of the present five-piece optical lens system, the focal length of the third lens element 930 and the fourth lens element 940 combined is f34, the focal length of the fifth lens element 950 is f5, and they satisfy the relation:
f34/f5=−1.1456.

In the ninth embodiment of the present five-piece optical lens system, the focal length of the first lens element 910 and the second lens element 920 combined is f12, the focal length of the third lens element 930, the fourth lens element 940 and the fifth lens element 950 combined is f345, and they satisfy the relation:
f12/f345=0.4026.

In the ninth embodiment of the present five-piece optical lens system, the focal length of the first lens element 910, the second lens element 920 and the third lens element 930 combined is f123, the focal length of the fifth lens element 950 is f5, and they satisfy the relation:
f123/f5=−3.3972.

In the ninth embodiment of the present five-piece optical lens system, the focal length of the five-piece optical lens system is f, the distance from the object-side surface 911 of the first lens element 910 to the image plane 970 along the optical axis 980 is TL, and they satisfy the relation:

f/TL=0.8023.

The detailed optical data of the ninth embodiment is shown in table 17, and the aspheric surface data is shown in table 18.

TABLE 17

(Embodiment 9)
f(focal length) = 3.5658 mm, Fno = 2.0, 2ω = 81°.

| Surface | | Curvature Radius | Thickness | Material | nd | vd |
|---|---|---|---|---|---|---|
| 0 | Object | Infinity | Infinity | | | |
| 1 | | Infinity | 0.1683545 | | | |
| 2 | STO | Infinity | −0.1683545 | | | |
| 3 | Lens 1 | 1.651641(ASP) | 0.6463439 | Plastic | 1.535 | 56 |
| 4 | | −13.68443(ASP) | 0.02820707 | | | |
| 5 | Lens 2 | 8.480676(ASP) | 0.24 | Plastic | 1.634 | 23.9 |
| 6 | | 2.158811(ASP) | 0.3702525 | | | |
| 7 | Lens 3 | 5.250802(ASP) | 0.4124818 | Plastic | 1.535 | 56 |
| 8 | | 5.175202(ASP) | 0.350191 | | | |
| 9 | Lens 4 | 59.27163(ASP) | 0.731086 | Plastic | 1.535 | 56 |
| 10 | | −0.9137602(ASP) | 0.1588668 | | | |
| 11 | Lens 5 | −3.747692(ASP) | 0.4117973 | Plastic | 1.535 | 56 |
| 12 | | 1.073326(ASP) | 0.4401541 | | | |
| 13 | IR-filter | Infinity | 0.21 | Glass | 1.5168 | 64.16734 |
| 14 | | Infinity | 0.4448469 | | | |
| 15 | Image | Infinity | | | | |

TABLE 18

Aspheric Coefficients

| Surface | 3 | 4 | 5 | 6 | 7 |
|---|---|---|---|---|---|
| K = | −2.21477 | 139.80261 | 2.17358 | −2.25202 | −2.40702 |
| A = | 0.050309 | −0.16954 | −0.22038 | −0.09055 | −0.16382 |
| B = | −0.0085 | 1.024084 | 1.166813 | 0.492897 | 0.067122 |
| C = | −0.05425 | −2.96787 | −2.95254 | −0.89779 | −0.01006 |
| D = | 0.126643 | 4.194788 | 3.80812 | 0.880725 | −0.07926 |
| E = | −0.20861 | −2.91808 | −2.29827 | −0.34472 | 0.090492 |
| F = | 0.105035 | 0.803352 | 0.527106 | 0.05051 | −0.0431 |

| Surface | 8 | 9 | 10 | 11 | 12 |
|---|---|---|---|---|---|
| K = | −230.921 | −2410.44 | −4.96882 | −113.145 | −7.06243 |
| A = | −0.02994 | −0.07676 | −0.12632 | −0.16092 | −0.08439 |
| B = | −0.15172 | 0.092277 | 0.135597 | 0.077222 | 0.031024 |
| C = | 0.180645 | −0.08674 | −0.05388 | −0.01557 | −0.00759 |
| D = | −0.16244 | 0.025449 | 0.009622 | 0.001513 | 8.40E−04 |
| E = | 0.082301 | −0.0024 | −7.95E−04 | −7.22E−05 | −1.50E−05 |
| F = | −0.01576 | 4.28E−04 | 5.32E−05 | 2.86E−06 | −2.51E−06 |

Figure 10A:
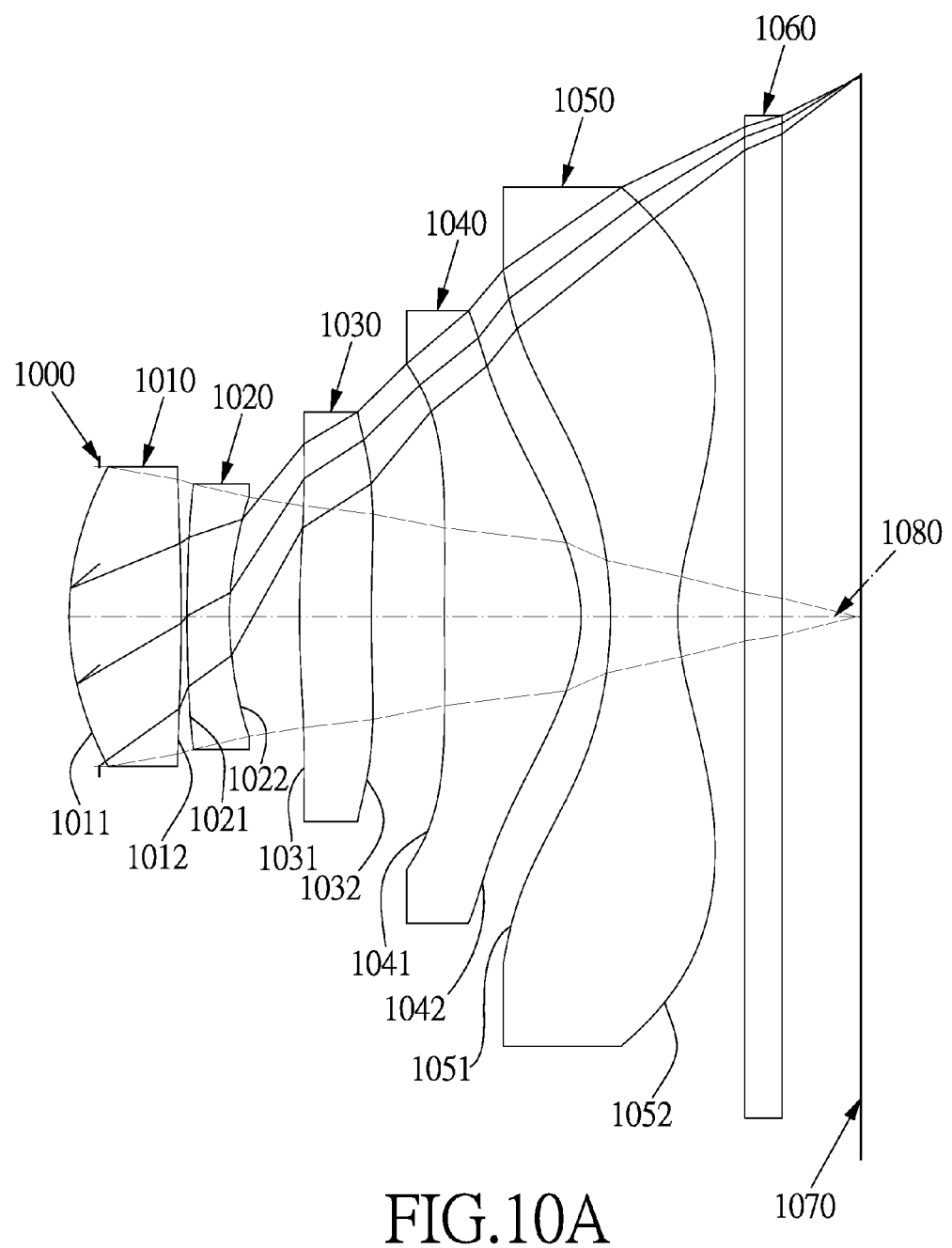
FIG. 10A shows a five-piece optical lens system in accordance with a tenth embodiment of the present invention.
Figure 10B:
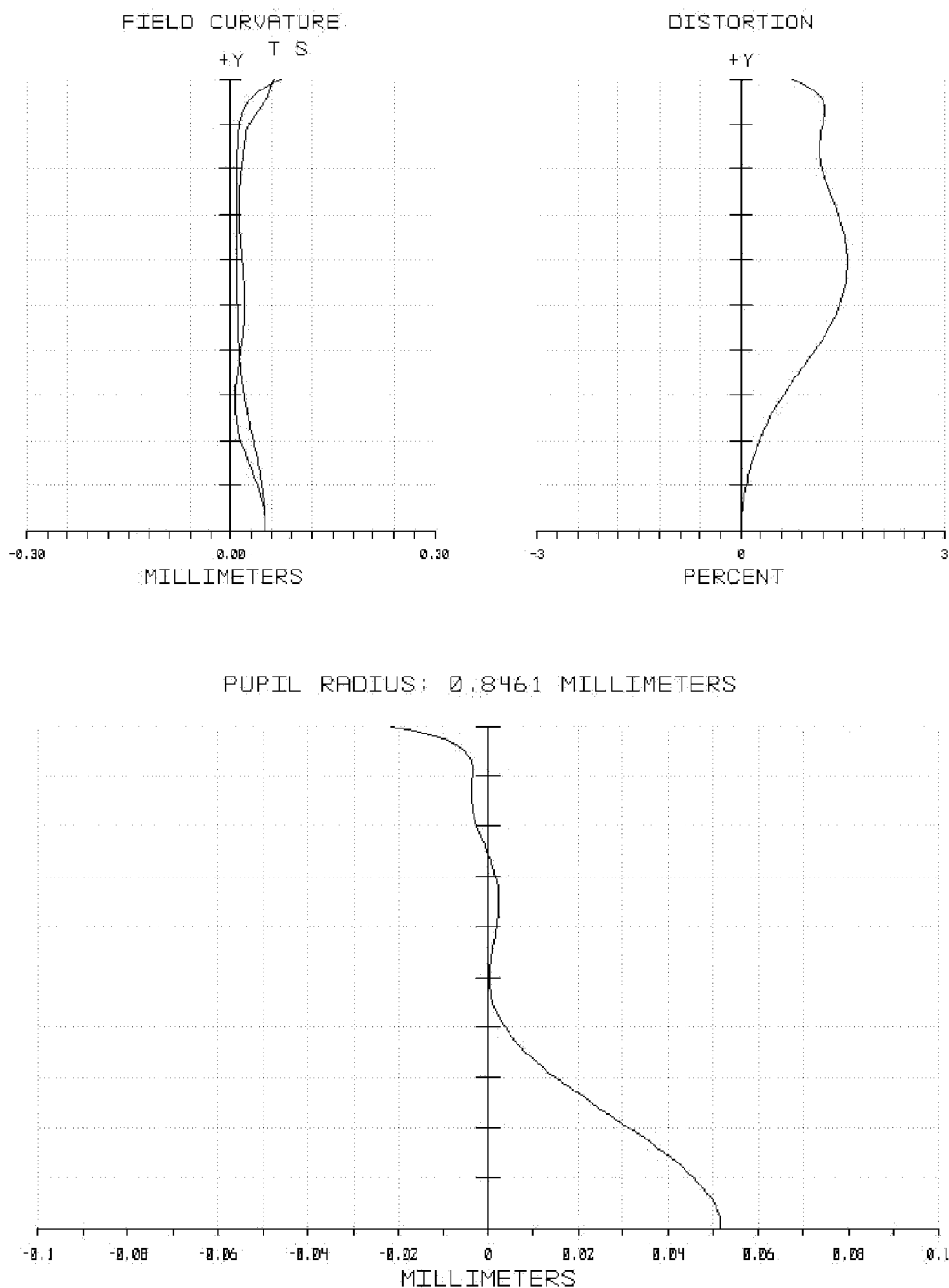
FIG. 10B shows the longitudinal spherical aberration curve, the astigmatic field curve and the distortion curve of the tenth embodiment of the present invention.

FIG. 10A shows a five-piece optical lens system in accordance with a tenth embodiment of the present invention, and FIG. 10B shows, in order from left to right, the longitudinal spherical aberration curves, the astigmatic field curves, and the distortion curve of the tenth embodiment of the present invention. A five-piece optical lens system in accordance with the tenth embodiment of the present invention comprises, in order from the object side to the image side: a stop 1000, a first lens element 1010, a second lens element 1020, a third lens element 1030, a fourth lens element 1040, a fifth lens element 1050, an IR cut filter 1060 and an image plane 1070.

The first lens element 1010 with a positive refractive power has an object-side surface 1011 being convex near an optical axis 1080 and an image-side surface 1012 being convex near the optical axis 1080, the object-side surface 1011 and the image-side surface 1012 are aspheric, and the first lens element 1010 is made of plastic material.

The second lens element 1020 with a negative refractive power has an object-side surface 1021 being convex near the optical axis 1080 and an image-side surface 1022 being concave near the optical axis 1080, the object-side surface 1021 and the image-side surface 1022 are aspheric, and the second lens element 1020 is made of plastic material.

The third lens element 1030 with a positive refractive power has an object-side surface 1031 being convex near the optical axis 1080 and an image-side surface 1032 being concave near the optical axis 1080, the object-side surface 1031 and the image-side surface 1032 are aspheric, the third lens element 1030 is made of plastic material, and at least one of the object-side and image-side surfaces 1031, 1032 of the third lens element 1030 has an inflection point.

The fourth lens element 1040 with a positive refractive power has an object-side surface 1041 being convex near the optical axis 1080 and an image-side surface 1042 being convex near the optical axis 1080, the object-side surface 1041 and the image-side surface 1042 are aspheric, the fourth lens element 1040 is made of plastic material, and at least one of the object-side and image-side surfaces 1041, 1042 of the fourth lens element 1040 has an inflection point.

The fifth lens element 1050 with a negative refractive power has an object-side surface 1051 being concave near the optical axis 1080 and an image-side surface 1052 being concave near the optical axis 1080, the object-side surface 1051 and the image-side surface 1052 are aspheric, and the fifth lens element 1050 is made of plastic material.

The IR cut filter 1060 made of glass is located between the seventh lens element 1050 and the image plane 1070 and has no influence on the focal length of the five-piece optical lens system.

The equation for the aspheric surface profiles of the tenth embodiment has the same form as that of the first embodiment. Therefore, an explanation in this regard will not be provided again.

In the tenth embodiment of the present five-piece optical lens system, the focal length of the five-piece optical lens system is f, the f-number of the five-piece optical lens system is Fno, the field of view of the five-piece optical lens system is 2ω, and they satisfy the relations:

f=3.6490 mm;
Fno=2.0; and
2ω=81°.

In the tenth embodiment of the present five-piece optical lens system, the focal length of the first lens element 1010 is f1, the focal length of the second lens element 1020 is f2, and they satisfy the relation:

f1/f2=−0.6409.

In the tenth embodiment of the present five-piece optical lens system, the focal length of the second lens element 1020 is f2, the focal length of the fourth lens element 1040 is f4, and they satisfy the relation:

f2/f4=−2.5718.

In the tenth embodiment of the present five-piece optical lens system, the focal length of the fourth lens element 1040 is f4, the focal length of the fifth lens element 1050 is f5, and they satisfy the relation:

f4/f5=−1.1925.

In the tenth embodiment of the present five-piece optical lens system, the focal length of the first lens element 1010 is f1, the focal length of the second lens element 1020 and the third lens element 1030 combined is f23, and they satisfy the relation:

f1/f23=−0.5298.

In the tenth embodiment of the present five-piece optical lens system, the focal length of the second lens element 1020 and the third lens element 1030 combined is f23, the focal length of the fourth lens element 1040 is f4, and they satisfy the relation:

f23/f4=−3.1109.

In the tenth embodiment of the present five-piece optical lens system, the focal length of the first lens element 1010 is f1, the focal length of the second lens element 1020, the third lens element 1030 and the fourth lens element 1040 combined is f234, and they satisfy the relation:

f1/f234=1.5748.

In the tenth embodiment of the present five-piece optical lens system, the focal length of the second lens element 1020, the third lens element 1030 and the fourth lens element 1040 combined is f234, the focal length of the fifth lens element 1050 is f5, and they satisfy the relation:

f234/f5=−1.2481.

In the tenth embodiment of the present five-piece optical lens system, the focal length of the first lens element 1010 and the second lens element 1020 combined is f12, the focal length of the third lens element 1030 and the fourth lens element 1040 combined is f34, and they satisfy the relation:

f12/f34=3.7740.

In the tenth embodiment of the present five-piece optical lens system, the focal length of the second lens element 1020 is f2, the focal length of the third lens element 1030 and the fourth lens element 1040 combined is f34, and they satisfy the relation:

f2/f34=−2.9195.

In the tenth embodiment of the present five-piece optical lens system, the focal length of the third lens element 1030 and the fourth lens element 1040 combined is f34, the focal length of the fifth lens element 1050 is f5, and they satisfy the relation:

f34/f5=−1.0505.

In the tenth embodiment of the present five-piece optical lens system, the focal length of the first lens element 1010 and the second lens element 1020 combined is f12, the focal length of the third lens element 1030, the fourth lens element 1040 and the fifth lens element 1050 combined is f345, and they satisfy the relation:

f12/f345=0.4377.

In the tenth embodiment of the present five-piece optical lens system, the focal length of the first lens element 1010, the second lens element 1020 and the third lens element 1030 combined is f123, the focal length of the fifth lens element 1050 is f5, and they satisfy the relation:

f123/f5=−3.2623.

In the tenth embodiment of the present five-piece optical lens system, the focal length of the five-piece optical lens system is f, the distance from the object-side surface 1011 of the first lens element 1010 to the image plane 1070 along the optical axis 1080 is TL, and they satisfy the relation:

f/TL=0.8160.

The detailed optical data of the tenth embodiment is shown in table 19, and the aspheric surface data is shown in table 20.

TABLE 19

(Embodiment 10)
f(focal length) = 3.6490 mm, Fno = 2.0, 2ω = 81°.

| Surface | | Curvature Radius | Thickness | Material | nd | vd |
|---|---|---|---|---|---|---|
| 0 | Object | Infinity | Infinity | | | |
| 1 | | Infinity | 0.172043 | | | |
| 2 | STO | Infinity | −0.17204 | | | |
| 3 | Lens 1 | 1.67856(ASP) | 0.63331 | Plastic | 1.535 | 56 |
| 4 | | −12.8294(ASP) | 0.032326 | | | |
| 5 | Lens 2 | 7.360966(ASP) | 0.24 | Plastic | 1.634 | 23.9 |
| 6 | | 2.001213(ASP) | 0.394406 | | | |
| 7 | Lens 3 | 4.851204(ASP) | 0.40766 | Plastic | 1.535 | 56 |
| 8 | | 7.462405(ASP) | 0.412489 | | | |

TABLE 19-continued (Embodiment 10)
f(focal length) = 3.6490 mm, Fno = 2.0, 2ω = 81°.

| Surface | | Curvature Radius | Thickness | Material | nd | vd |
|---|---|---|---|---|---|---|
| 9 | Lens 4 | 22.69739(ASP) | 0.770896 | Plastic | 1.535 | 56 |
| 10 | | −0.93969(ASP) | 0.166415 | | | |
| 11 | Lens 5 | −2.32474(ASP) | 0.380477 | Plastic | 1.535 | 56 |
| 12 | | 1.206346(ASP) | 0.378708 | | | |
| 13 | IR-filter | Infinity | 0.21 | Glass | 1.5168 | 64.16734 |
| 14 | | Infinity | 0.444847 | | | |
| 15 | Image | Infinity | | | | |

TABLE 20

Aspheric Coefficients

| Surface | 3 | 4 | 5 | 6 | 7 |
|---|---|---|---|---|---|
| K= | −2.22765 | 102.97293 | 0.19139 | −3.15002 | 13.09219 |
| A= | 0.047378 | −0.13827 | −0.22774 | −0.09725 | −0.14359 |
| B = | −0.00024 | 1.055187 | 1.187739 | 0.502039 | 0.064454 |
| C= | −0.04961 | −2.9647 | −2.93085 | −0.89517 | −0.01523 |
| D = | 0.138264 | 4.185821 | 3.787811 | 0.874533 | −0.06736 |
| E= | −0.19962 | −2.89685 | −2.35587 | −0.33679 | 0.103482 |
| F= | 0.102493 | 0.783742 | 0.55383 | 0.013704 | −0.04334 |

| Surface | 8 | 9 | 10 | 11 | 12 |
|---|---|---|---|---|---|
| K= | −735.703 | −396.269 | −4.83901 | −23.0046 | −8.27496 |
| A= | −0.02357 | −0.08853 | −0.12514 | −0.16777 | −0.07444 |
| B = | −0.14377 | 0.096981 | 0.134537 | 0.080309 | 0.02496 |
| C= | 0.186117 | −0.08497 | −0.05436 | −0.01492 | −0.00623 |
| D = | −0.15904 | 0.026924 | 0.010015 | 0.001368 | 8.05E−04 |
| E= | 0.084532 | −0.00255 | −4.49E−04 | −0.00011 | −4.71E−05 |
| F= | −0.01623 | −1.2E−06 | −7.93E−05 | 8.05E−06 | 7.19E−07 |

TABLE 21

| | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 |
|---|---|---|---|---|---|---|---|---|---|---|
| f | 3.8094 | 3.9144 | 3.6087 | 3.7166 | 4.0454 | 3.9527 | 4.1072 | 3.5615 | 3.5658 | 3.6490 |
| Fno | 2.0 | 2.0 | 2.0 | 2.0 | 2.0 | 2.0 | 2.0 | 2.0 | 2.0 | 2.0 |
| 2ω | 77 | 77 | 80 | 80 | 75 | 75 | 73 | 81 | 81 | 81 |
| f1/f2 | −0.6417 | −0.6210 | −0.6057 | −0.6087 | −0.6170 | −0.6246 | −0.6530 | −0.6100 | −0.6064 | −0.6409 |
| f2/f4 | −2.3983 | −2.6635 | −2.8171 | −2.7711 | −2.6123 | −2.6194 | −2.5776 | −2.7232 | −2.7295 | −2.5718 |
| f4/f5 | −1.0865 | −1.0875 | −1.0535 | −1.0700 | −1.0805 | −1.1045 | −1.0891 | −1.0728 | −1.1155 | −1.1925 |
| f1/f23 | −0.6966 | −0.7258 | −0.7217 | −0.7214 | −0.7391 | −0.7304 | −0.7577 | −0.6758 | −0.6192 | −0.5298 |
| f23/f4 | −2.2094 | −2.2790 | −2.3641 | −2.3380 | −2.1808 | −2.2399 | −2.2215 | −2.4582 | −2.6728 | −3.1109 |
| f1/f234 | 1.3440 | 1.5594 | 1.5523 | 1.5521 | 1.5251 | 1.5532 | 1.6445 | 1.4815 | 1.5013 | 1.5748 |
| f234/f5 | −1.2442 | −1.1536 | −1.1579 | −1.1628 | −1.1419 | −1.1634 | −1.1147 | −1.2030 | −1.2298 | −1.2481 |
| f12/f34 | 2.8731 | 3.0399 | 3.0618 | 3.0485 | 2.9181 | 3.0283 | 3.2111 | 3.0152 | 3.0635 | 3.7740 |
| f2/f34 | −2.2899 | −2.5455 | −2.6806 | −2.6424 | −2.4911 | −2.5088 | −2.4840 | −2.6125 | −2.6577 | −2.9195 |
| f34/f5 | −1.1379 | −1.1380 | −1.1071 | −1.1221 | −1.1331 | −1.1532 | −1.1301 | −1.1183 | −1.1456 | −1.0505 |
| f12/f345 | 0.3610 | 0.3140 | 0.4290 | 0.3803 | 0.2430 | 0.2907 | 0.3635 | 0.4311 | 0.4026 | 0.4377 |
| f123/f5 | −3.2567 | −3.7190 | −3.7082 | −3.7301 | −3.6240 | −3.7748 | −3.9408 | −3.4597 | −3.3972 | −3.2623 |
| f/TL | 0.8012 | 0.8035 | 0.7869 | 0.7910 | 0.8093 | 0.8036 | 0.7972 | 0.7960 | 0.8023 | 0.8160 |

In the present five-piece optical lens system, the lens elements can be made of plastic or glass. If the lens elements are made of plastic, the cost will be effectively reduced. If the lens elements are made of glass, there is more freedom in distributing the refractive power of the five-piece optical lens system. Plastic lens elements can have aspheric surfaces, which allow more design parameter freedom (than spherical surfaces), so as to reduce the aberration and the number of the lens elements, as well as the total track length of the five-piece optical lens system.

In the present five-piece optical lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave. Table 21 lists the relevant data for the various embodiments of the present invention.

While we have shown and described various embodiments in accordance with the present invention, it should be clear to those skilled in the art that further embodiments may be made without departing from the scope of the present invention.

What is claimed is:

1. A five-piece optical lens system comprising, in order from an object side to an image side:
   a stop;
   a first lens element with a positive refractive power having a convex image-side surface, at least one of an object-side and the image-side surfaces of the first lens element being aspheric;
   a second lens element with a negative refractive power having a convex object-side surface, at least one of the object-side and an image-side surfaces of the second lens element being aspheric;
   a third lens element having a concave image-side surface, at least one of an object-side and the image-side surfaces of the second lens element being aspheric; and
   a fourth lens element with a positive refractive power having a convex object-side surface, at least one of the object-side and an image-side surfaces of the fourth lens element being aspheric; and
   a fifth lens element with a negative refractive power having a concave object-side surface, at least one of the object-side and an image-side surfaces of the fifth lens element being aspheric;
   wherein a focal length of the first lens element is f1, a focal length of the second lens element and the third lens element combined is f23, and they satisfy the relation:
   −0.9<f1/f23<−0.3.

2. The five-piece optical lens system as claimed in claim 1, wherein at least one of the object-side and the image-side surfaces of the third lens element is formed with an inflection point, and at least one of the object-side and the image-side surfaces of the fourth lens element is formed with an inflection point.

3. The five-piece optical lens system as claimed in claim 1, wherein a focal length of the first lens element is f1, a focal length of the second lens element is f2, and they satisfy the relation:
   −0.8<f1/f2<−0.4.

4. The five-piece optical lens system as claimed in claim 1, wherein a focal length of the second lens element is f2, a focal length of the fourth lens element is f4, and they satisfy the relation:
   −3.3<f2/f4<−2.0.

5. The five-piece optical lens system as claimed in claim 1, wherein a focal length of the fourth lens element is f4, a focal length of the fifth lens element is f5, and they satisfy the relation:
   −1.4<f4/f5<−0.8.

6. The five-piece optical lens system as claimed in claim 1, wherein a focal length of the second lens element and the third lens element combined is f23, a focal length of the fourth lens element is f4, and they satisfy the relation:
   −3.8<f23/f4<1.8.

7. The five-piece optical lens system as claimed in claim 1, wherein a focal length of the first lens element is f1, a focal length of the second lens element, the third lens element and the fourth lens element combined is f234, and they satisfy the relation:
   1.0<f1/f234<2.0.

8. The five-piece optical lens system as claimed in claim 1, wherein a focal length of the second lens element, the third lens element and the fourth lens element combined is f234, a focal length of the fifth lens element is f5, and they satisfy the relation:
   −1.6<f234/f5<−0.8.

9. The five-piece optical lens system as claimed in claim 1, wherein a focal length of the first lens element and the second lens element combined is f12, a focal length of the third lens element and the fourth lens element combined is f34, and they satisfy the relation:
   2.0<f12/f34<4.5.

10. The five-piece optical lens system as claimed in claim 1, wherein a focal length of the second lens element is f2, a focal length of the third lens element and the fourth lens element combined is f34, and they satisfy the relation:
    −3.5<f2/f34<−1.7.

11. The five-piece optical lens system as claimed in claim 1, wherein a focal length of the third lens element and the fourth lens element combined is f34, a focal length of the fifth lens element is f5, and they satisfy the relation:
    −1.4<f34/f5<−0.8.

12. The five-piece optical lens system as claimed in claim 1, wherein a focal length of the first lens element and the second lens element combined is f12, a focal length of the third lens element, the fourth lens element and the fifth lens element combined is f345, and they satisfy the relation:
    0.1<f12/f345<0.6.

13. The five-piece optical lens system as claimed in claim 1, wherein a focal length of the first lens element, the second lens element and the third lens element combined is f123, a focal length of the fifth lens element is f5, and they satisfy the relation:
    −4.2<f123/f5<−2.7.

14. The five-piece optical lens system as claimed in claim 1, wherein a focal length of the five-piece optical lens system is f, a distance from the object-side surface of the first lens element to an image plane along an optical axis is TL, and they satisfy the relation:
    0.7<f/TL<0.9.

* * * * *